US008600799B2

(12) United States Patent
Chang et al.

(10) Patent No.: US 8,600,799 B2
(45) Date of Patent: Dec. 3, 2013

(54) METHOD AND SYSTEM FOR SALES-CREDIT ASSIGNMENT VIA TIME-BASED ORGANIZATION HIERARCHIES

(75) Inventors: Daniel T. Chang, Belmont, CA (US); Alexander Goldstein, Foster City, CA (US); Ashish Singhal, Union City, CA (US); Pankaj Bhatia, Hayward, CA (US); Bhakti Vithalani, Foster City, CA (US); Pasan Rukmal Sirisena, San Mateo, CA (US); Steve Apfelberg, Menlo Park, CA (US); Marc Verbeek, Foster City, CA (US); Tarri Furlong, San Leandro, CA (US); Ashley Stirrup, Burlingame, CA (US); Ajay Sabhlok, Fremont, CA (US); Martin Renaud, San Carlos, CA (US)

(73) Assignee: Siebel Systems, Inc., San Mateo, CA (US)

( * ) Notice: Subject to any disclaimer, the term of this patent is extended or adjusted under 35 U.S.C. 154(b) by 2034 days.

(21) Appl. No.: 10/273,679

(22) Filed: Oct. 18, 2002

(65) Prior Publication Data
US 2007/0226027 A1   Sep. 27, 2007

Related U.S. Application Data

(60) Provisional application No. 60/333,432, filed on Nov. 27, 2001.

(51) Int. Cl.
*G06Q 10/00*   (2012.01)

(52) U.S. Cl.
USPC .......................................... 705/7.42

(58) Field of Classification Search
USPC ...................................... 705/8, 7.42
See application file for complete search history.

(56) References Cited

U.S. PATENT DOCUMENTS

| 5,386,557 | A | | 1/1995 | Boykin et al. ................... 707/1 |
|---|---|---|---|---|
| 5,878,400 | A | | 3/1999 | Carter ............................ 708/20 |
| 5,924,077 | A | * | 7/1999 | Beach et al. ................... 705/10 |
| 6,023,703 | A | | 2/2000 | Hill ............................. 707/100 |
| 6,067,531 | A | | 5/2000 | Hoyt et al. ..................... 705/35 |
| 6,105,001 | A | | 8/2000 | Masi et al. ................... 705/14.1 |
| 6,134,533 | A | | 10/2000 | Shell .......................... 705/26.82 |
| 6,360,188 | B1 | * | 3/2002 | Freidman et al. ................ 703/1 |
| 6,405,207 | B1 | | 6/2002 | Petculescu et al. ........... 707/102 |
| 6,415,298 | B1 | | 7/2002 | Oesterer et al. ...................... 1/1 |

(Continued)

OTHER PUBLICATIONS

Colletti et al. Compensating New Sales Roles: How to Design Rewards That Work in Today's Selling Environment, Second Edition, May 2001, AMACOM, p. 90.

*Primary Examiner* — Jonathan G Sterrett
(74) *Attorney, Agent, or Firm* — Campbell Stephenson LLP

(57) ABSTRACT

A method, system, and article of manufacture for defining and managing instances of time-based organization hierarchies, and for assigning sales credit to corresponding positions within the time-based organization hierarchy in response to a sales data input are disclosed herein. In one embodiment, a user may define and/or manage one or more instances of the time-based organization hierarchy via a user interface generated on a client. Moreover, and in response to the sales data input corresponding to a transaction, a sales credit assignment process may then be executed to assign sales credit to one or more positions within the instance of the time-based organization hierarchy based on an evaluation of conditions specified in one or more identified assignment rules associated with the time-based organization hierarchy.

23 Claims, 11 Drawing Sheets

(56) References Cited

U.S. PATENT DOCUMENTS

| | | | |
|---|---|---|---|
| 6,421,648 B1 | 7/2002 | Gagnon et al. | 705/1.1 |
| 6,601,048 B1 * | 7/2003 | Gavan et al. | 706/10 |
| 6,604,084 B1 * | 8/2003 | Powers et al. | 705/7.41 |
| 6,618,706 B1 | 9/2003 | Rive et al. | 705/30 |
| 6,625,602 B1 | 9/2003 | Meredith et al. | 707/8 |
| 6,662,164 B1 * | 12/2003 | Koppelman et al. | 705/14 |
| 6,691,093 B2 | 2/2004 | Shell | 705/26.8 |
| 6,947,946 B2 | 9/2005 | Nishikawa | 1/1 |
| 6,947,951 B1 * | 9/2005 | Gill | 707/104.1 |
| 7,149,707 B2 | 12/2006 | Scoble | 704/14.16 |
| 7,320,001 B1 * | 1/2008 | Chen | 1/1 |
| 7,644,009 B2 | 1/2010 | Amerasinghe et al. | 705/7.31 |
| 7,653,564 B2 * | 1/2010 | Fergusson et al. | 705/7.42 |
| 7,925,513 B2 * | 4/2011 | Chao et al. | 705/7.11 |
| 2001/0049622 A1 * | 12/2001 | Gozdeck et al. | 705/11 |
| 2002/0082892 A1 * | 6/2002 | Raffel et al. | 705/8 |
| 2002/0091649 A1 | 7/2002 | Anvekar et al. | 705/72 |
| 2002/0169678 A1 | 11/2002 | Chao et al. | 705/26 |
| 2003/0023477 A1 * | 1/2003 | Fergusson et al. | 705/11 |
| 2003/0028443 A1 | 2/2003 | Ellis et al. | 705/26 |
| 2003/0101091 A1 * | 5/2003 | Levin et al. | 705/11 |
| 2005/0010550 A1 | 1/2005 | Potter et al. | 707/1 |
| 2007/0226025 A1 | 9/2007 | Chang et al. | 705/8 |
| 2007/0226026 A1 | 9/2007 | Chang et al. | 705/8 |

* cited by examiner

| HIERARCHY NAME | SALES CATEGORY | RULE STATUS | RULE START | RULE END | RULE TYPE PRIORITY # | LOWEST LEVEL | LEVEL | RULE | TERRITORY |
|---|---|---|---|---|---|---|---|---|---|
| US | DIRECT | APPROVED | 01/01/2003 | 12/31/2003 | 1 | T | 4 | R001 | T1 |
| US | DIRECT | APPROVED | 01/01/2003 | 12/31/2003 | 1 | T | 4 | R002 | T2 |
| US | DIRECT | APPROVED | 01/01/2003 | 12/31/2003 | 1 | T | 3 | R003 | T3 |
| US | DIRECT | APPROVED | 01/01/2003 | 12/31/2003 | 1 | T | 3 | R004 | T4 |
| US | DIRECT | APPROVED | 01/01/2003 | 12/31/2003 | 1 | F | 3 | R005 | T5 |
| US | DIRECT | APPROVED | 01/01/2003 | 12/31/2003 | 1 | F | 3 | R006 | T6 |
| US | DIRECT | APPROVED | 01/01/2003 | 12/31/2003 | 1 | F | 2 | R007 | T7 |
| US | DIRECT | APPROVED | 01/01/2003 | 12/31/2003 | 1 | F | 1 | R008 | T8 |
| US | DIRECT | APPROVED | 01/01/2003 | 12/31/2003 | 2 | T | 4 | R009 | T9 |
| US | DIRECT | APPROVED | 01/01/2003 | 12/31/2003 | 2 | T | 4 | R010 | T10 |
| US | DIRECT | APPROVED | 01/01/2003 | 12/31/2003 | 2 | F | 4 | R011 | T11 |
| US | DIRECT | APPROVED | 01/01/2003 | 12/31/2003 | 2 | F | 4 | R012 | T12 |
| US | DIRECT | APPROVED | 01/01/2003 | 12/31/2003 | 2 | F | 3 | R013 | T13 |
| ... | ... | ... | ... | ... | ... | ... | ... | ... | ... |

| RULE TYPE PRIORITY # | LOWEST LEVEL | LEVEL | RULE | SEQUENCE |
|---|---|---|---|---|
| 1 | T | 4 | R001 | 1 |
| 1 | T | 4 | R002 | 1 |
| 1 | T | 3 | R003 | 1 |
| 1 | T | 3 | R004 | 1 |
| 1 | F | 3 | R005 | 2 |
| 1 | F | 3 | R006 | 2 |
| 1 | F | 2 | R007 | 3 |
| 1 | F | 1 | R008 | 4 |
| 2 | T | 4 | R009 | 5 |
| 2 | T | 4 | R010 | 5 |
| 2 | F | 4 | R011 | 6 |
| 2 | F | 4 | R012 | 6 |
| 2 | F | 3 | R013 | 7 |

| ORDER # | ASSIGNMENT TYPE | SALES MODEL | REASON | STATUS | PRIORITY | SALES TEAM |
|---|---|---|---|---|---|---|
| 1-2884213 | PROPER | DIRECT | LOWEST LEVEL | CLOSED | LOW | JANE TEAM |
| 1-2884230 | IMPROPER | DIRECT | < 100% | OPEN | HIGH | TOM TEAM |
| 1-2884247 | PROPER | DIRECT | LOWEST LEVEL | CLAIMING | MEDIUM | TERRY TEAM |
| 1-2884179 | IMPROPER | DIRECT | > 100% | RE-ASSIGNED | HIGH | DAVE TEAM |
| 1-2884196 | UNALLOCATED | DIRECT | NOT ALLOCATED | OPEN | HIGH | 1503 |

| CR # | ORDER # | SALES TEAM | STATUS | DESCRIPTION |
|---|---|---|---|---|
| 2-035 | 1-2884230 | TOM, 100%, US | APPROVED | WORKED ON DEAL |
| 2-043 | 1-2884179 | DAVE, 50%, NW SUE, 50%, NW | SUBMITTED | HELPED ON DEMO |
| 2-017 | 1-2884196 | TERRY, 100%, CE | CANCELED | WORKED ON DEAL |

*FIG. 16*

METHOD AND SYSTEM FOR SALES-CREDIT ASSIGNMENT VIA TIME-BASED ORGANIZATION HIERARCHIES

CROSS-REFERENCE TO RELATED APPLICATION

This application is related to provisional application Ser. No. 60/333,432, filed Nov. 27, 2001, and titled METHOD AND SYSTEM FOR SALES-CREDIT ASSIGNMENT VIA TIME-BASED ORGANIZATION HIERARCHIES. The benefit of the filing date of the above-identified application is hereby claimed pursuant to 35 U.S.C. §119(e)(1).

TECHNICAL FIELD OF THE INVENTION

This disclosure relates generally to sales-based compensation mechanisms, and more particularly, but not exclusively, to a method, system, and article of manufacture for managing time-based organization hierarchies and assigning sales-credit via the time-based organization hierarchies.

BACKGROUND INFORMATION

Many large companies compensate employees on a commission basis in relation to sales credited to the employees. Typically, the management structure of these companies is organized as a hierarchy from the company president, for example, to the sales representatives. In order to provide credit for a given sale to multiple individuals, such as the sales representative, the sales manager, and the like, these companies often have complex sales organizations developed to provide matrix coverage, or territories wherein multiple people or groups of people receive credit on a single sale. For example, sales credit may be distributed to multiple individuals by adding everyone who is to be compensated for a transaction to a sales team (e.g., adding managers into the sales team with the sales representatives), or to a compensation group. However, as the complexity of the management structure increases, so to does the administration of these sales organizations.

In addition, sales organizations developed from the current hierarchical management structure generally allow sales credit to be assigned, and compensation to be calculated, only for the latest instance of a particular sales model. As changes occur in the management structure of the company (e.g., reorganization or personnel changes), the complexity of properly assigning sales credit and calculating compensation becomes increasingly complex and administratively burdensome.

SUMMARY OF THE ILLUSTRATED EMBODIMENTS

An aspect of the illustrated embodiments is to provide a method, system, and article of manufacture for defining and managing instances of time-based organization hierarchies, and for assigning sales credit to corresponding positions within the time-based organization hierarchy in response to a sales data input. In one embodiment, a user may define and/or manage one or more instances of the time-based organization hierarchy via a user interface generated on a client. Moreover, and in response to the sales data input corresponding to a transaction, a sales credit assignment process may then be executed to assign sales credit to one or more positions within the instance of the time-based organization hierarchy based on an evaluation of conditions specified in one or more identified assignment rules associated with the time-based organization hierarchy.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein:

FIG. 7A is an illustration of an example screen display showing an embodiment of a UI display configured to define and manage seasonality skews of an example organization hierarchy in accordance with an embodiment of the present invention;

Figure 8A:
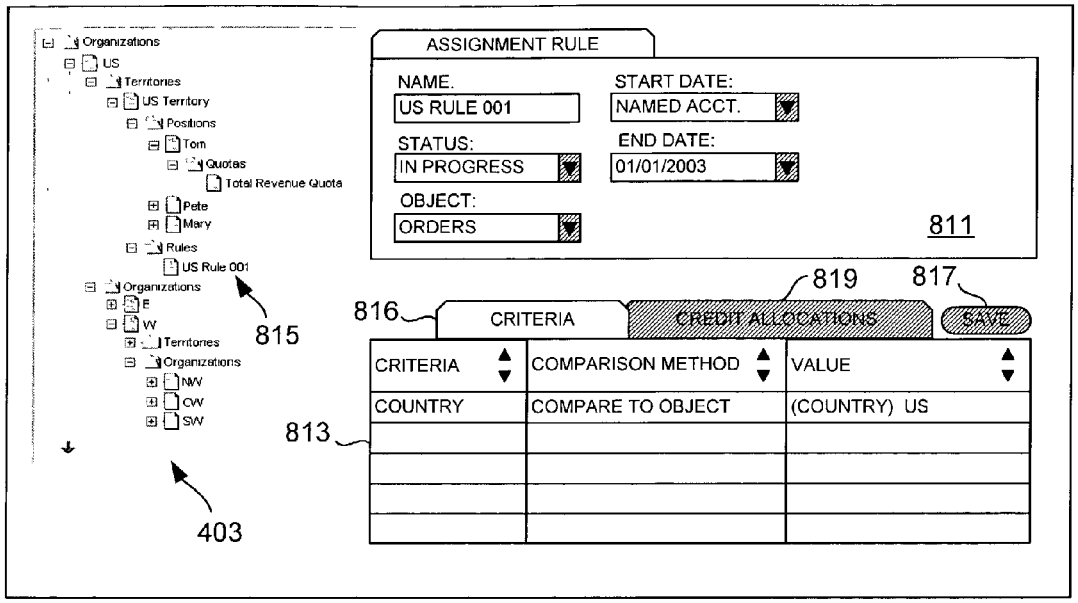
Figure 8B:
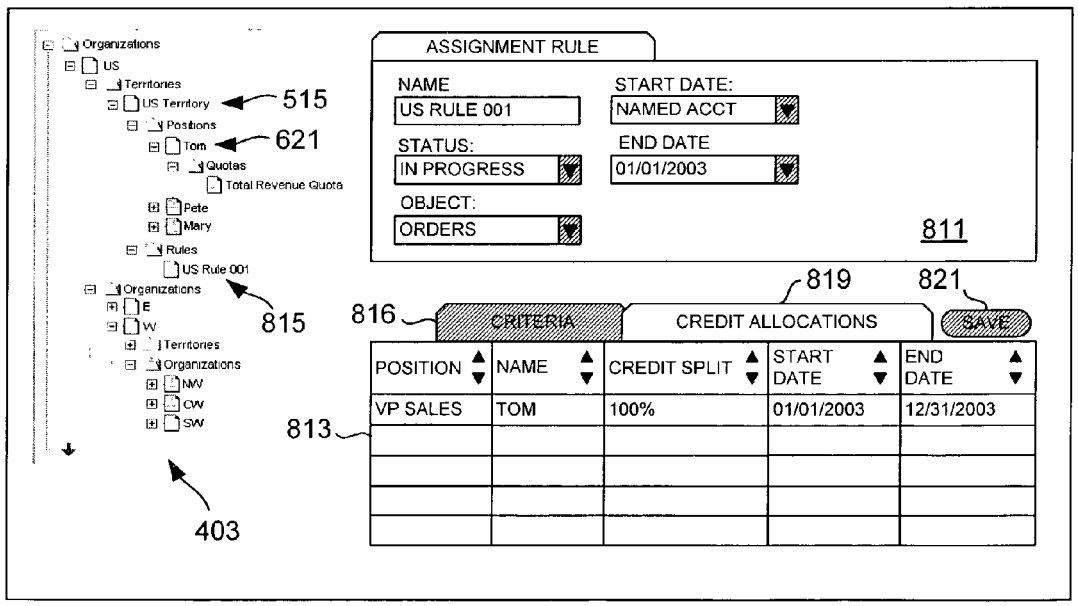
Figures 9, 10:
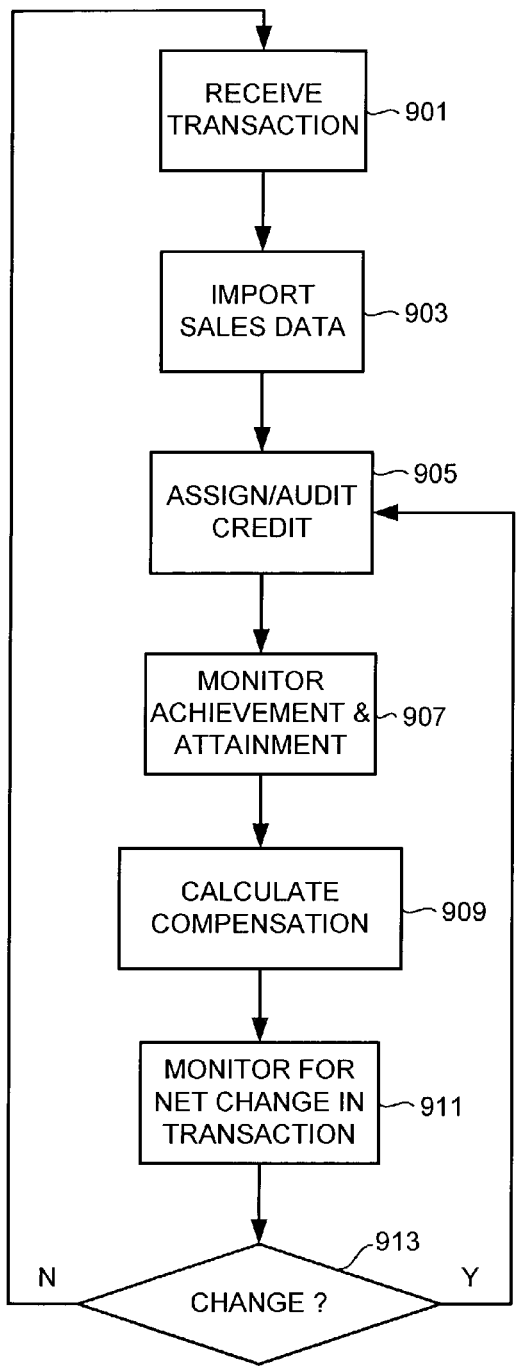
Figure 11:
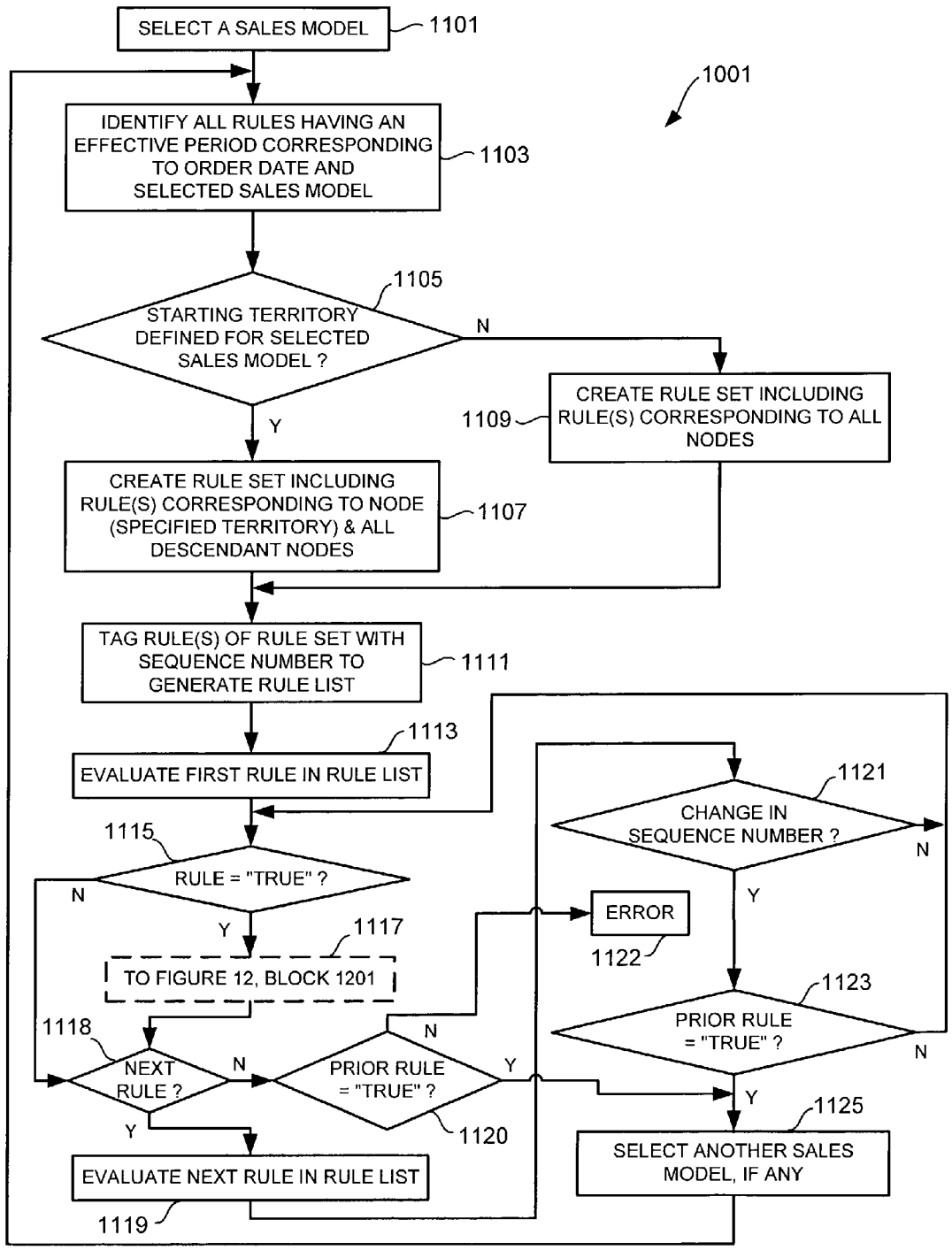
Figure 12:
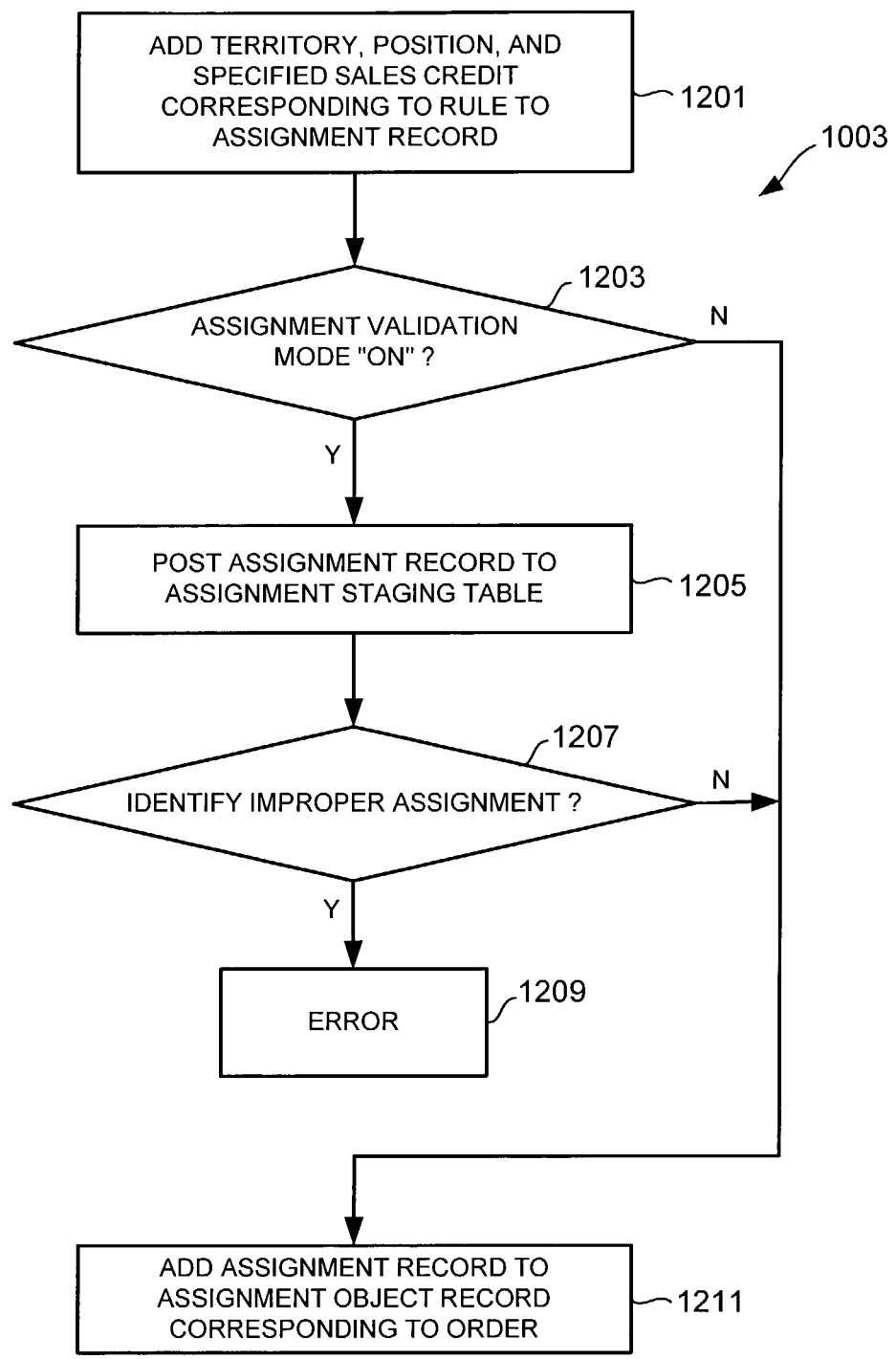

FIGS. 8, 8A, and 8B are illustrations of example screen displays showing embodiments of UI displays configured to define and manage rules of an example organization hierarchy in accordance with an embodiment of the present invention;

FIG. 9 is a flow diagram illustrating an embodiment of a flow of events in an example sales-based compensation process in accordance with an embodiment of the present invention;

FIG. 10 is a flow diagram illustrating an embodiment of a flow of events in an example sales credit assignment process in accordance with an embodiment of the present invention;

FIG. 11 is a flow diagram illustrating an embodiment of a flow of events in an example assignment rule evaluation process in accordance with an embodiment of the present invention;

FIG. 12 is a flow diagram illustrating an embodiment of a flow of events in an example assignment object record generation process in accordance with an embodiment of the present invention;

FIG. 13 is an illustration of an example rule set in accordance with an embodiment of the present invention;

FIG. 14 is an illustration of an example rule list in accordance with an embodiment of the present invention;

FIG. 15 is an illustration of an example assignment error and claiming table in accordance with an embodiment of the present invention; and FIG. 16 is an illustration of an example claim request table in accordance with an embodiment of the present invention.

DETAILED DESCRIPTION OF THE ILLUSTRATED EMBODIMENTS

Embodiments of a method, system, and article of manufacture for defining and managing time-based organization hierarchies and assigning sales credits to facilitate calculation of compensation related to transactions are described in detail herein. In the following description, numerous specific details are provided, such as the identification of various system components, to provide a thorough understanding of embodiments of the invention. One skilled in the art will recognize, however, that embodiments of the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide a method, system, and article of manufacture to define and manage instances of time-based organization hierarchies (also referred to as "sales hierarchies"), and to assign sales credit to corresponding positions within the time-based organization hierarchies in response to a sales data input. In one representative example, an embodiment of a UI, implemented via a network system in accordance with an embodiment of the present invention, may include a plurality of UI displays configured to define and/or manage one or more instances of a time-based organization hierarchy (also "organization hierarchy") via user input. For example, the user may define an instance of the time-based organization hierarchy to include a plurality of nodes, each corresponding to a defined territory. In various embodiments, the territories may correspond to a geographical area, to an industry sector, or the like. The user may also define a position to correspond to each territory for which sales credit may be assigned, and compensation may be calculated, in response to a sales data input related to a transaction.

For example, the instance of the time-based organization hierarchy may comprise a pyramid structure including a company president position corresponding to a node at an upper-most level (e.g., a "root node" or "primary node"), followed by a pair of sales manager positions corresponding to a pair of nodes at a middle level (e.g., "secondary nodes"), and a plurality of sales representative positions corresponding to a plurality of nodes at a lower-most level (e.g., "tertiary nodes") of the organization hierarchy. When the transaction (e.g., sale of a product/service) occurs, the sales data input (e.g., corresponding to data, including an order date, amount, quantity, location, and the like) may be processed to assign sales credit to the lower-most node from which the transaction originated. Moreover, a corresponding sales credit may then be rolled-up to each successive parent node in the organization hierarchy until the root node (e.g., the primary node) is reached.

The time-based organization hierarchy may also be defined, in an embodiment, to correspond to a sales model (e.g., direct sales), and to have an effective period. The effective period may be defined by a start date and an end date. In this manner, multiple instances of the time-based organization hierarchy, each with an entirely distinct effective period, may be defined with minor variations (e.g., related to personnel changes, organization structure changes, or the like) to permit sales credit to be assigned, and attainment and/or compensation calculated, for any one or more of the positions with regard to any one corresponding time period. By maintaining instances of the time-based organization hierarchy corresponding to different calendar periods (e.g., via storage in a memory), retroactive calculations may be made to reflect adjustments in sales data (e.g., changes to an order) that occur after the corresponding organization hierarchy has been made obsolete by an updated instance. In one embodiment, efficient storage of a plurality of instances of an organization hierarchy may include storing revisions made to successive versions of the hierarchy. Other features of the illustrated embodiments will be apparent to the reader from the foregoing and the appended claims, and as the detailed description and discussion is read in conjunction with the accompanying drawings.

Figure 1:
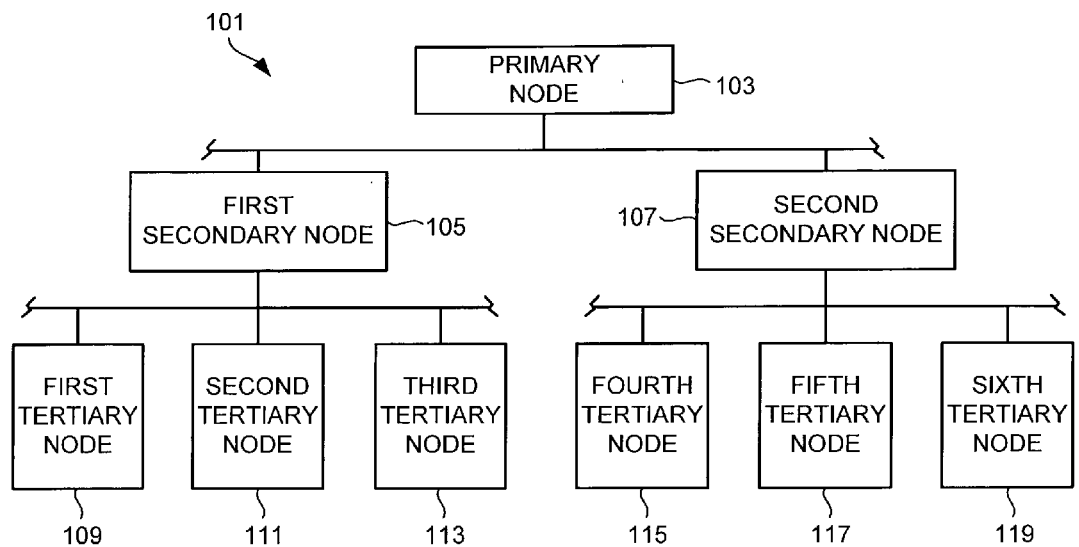
FIG. 1 is a pictorial illustration of an example organization hierarchy in accordance with an embodiment of the present invention.

With reference now to the drawings, and in particular to FIG. 1, an embodiment of a time-based organization hierarchy 101 is illustrated in accordance with an embodiment of the present invention. In the illustrated embodiment, the time-based organization hierarchy 101 includes a primary node 103 (e.g., the root node) at an upper-most level of the hierarchy. At a level directly below the primary node 103 are a first secondary node 105 and a second secondary node 107. In turn, at a level directly below the first secondary node 103 are a first tertiary node 109, a second tertiary node 111, and a third tertiary node 113. Similarly, directly below the second secondary node 105 are a fourth tertiary node 115, a fifth tertiary node 117, and a sixth tertiary node 119. It will be appreciated that the organization hierarchy 101 illustrated in FIG. 1 and described herein is intended only as an example. Additional nodes may be included at each level of the hierarchy, and/or additional levels may also be included in the organization hierarchy 101 in embodiments in accordance with an embodiment of the present invention.

In one embodiment, each of the nodes 103-119 of the time-based organization hierarchy 101 may correspond to a defined territory. Each territory may be defined, for example, to correspond to a geographical area such as the United States, or parts thereof, or to an industry sector, such as telecommunications, banking, automotive, or the like, or to parts thereof. For instance, the primary node 103 may be defined to correspond to a territory encompassing the geographical area of the entire United States. Furthermore, the first secondary node 105 may be defined to correspond to the western United States, while the second secondary node 107 may be defined to correspond to the eastern United States (e.g., the geographical area east of the Mississippi River). In turn, each of the tertiary nodes 109-119 of the time-based organization hierarchy 101 illustrated in FIG. 1 may further subdivide the geographical area, for example, corresponding to the node (e.g., the secondary nodes 105 and 107) from which they stem in the organization hierarchy 101. For example, the tertiary nodes 109-119 may correspond to a northwest, centerwest, southwest, northeast, centereast, and southeast territory, respectively, each corresponding to a group of states, in an embodiment. It will be appreciated that nodes associated with additional levels of the organization hierarchy 101 may further subdivide the geographical area, for example, into smaller and smaller parts in various embodiments. In one embodiment, each node (e.g., the nodes 103-119) may correspond to a unique territory (only one node in the instance of the organization hierarchy corresponds to that territory), as will be discussed in greater detail hereinafter.

It will be appreciated that methodologies in accordance with an embodiment of the present invention described herein may comprise a set of machine-readable instructions capable of implementation by a computer or other device, in an embodiment. As used herein, the term "machine-readable medium" shall be taken to include any medium that is capable of storing data, information, or encoding a sequence of instructions or operations for execution by a processor to cause the performance of the methodologies of embodiments of the present invention. The term "machine-readable medium" shall be understood to include, for example, solid-state memories, read-only memory components, random-access memory components, magnetic disk storage media, optical storage media, flash memory devices, electrical, optical, or other form of propagated signals (e.g., carrier tones, infrared signals, and digital signals), and the like.

Figure 2:
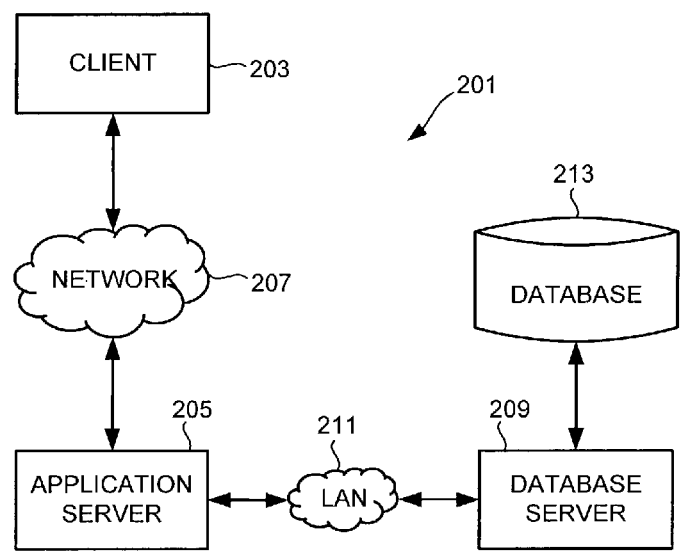
FIG. 2 is a block diagram illustrating an embodiment of a network system in accordance with an embodiment of the present invention.

In one embodiment, the methodologies of embodiments of the present invention may be implemented via a graphical UI generated by a client, such as a computer system, or the like. For example, FIG. 2 is a block diagram illustration of an embodiment of a network system 201 in which methodologies in accordance with an embodiment of the present invention may be implemented. In the illustrated embodiment, the network system 201 includes a client 203 communicatively coupled to an application server 205 via a network 207. The application server 205 may in turn be communicatively coupled to a database server 209 via a local area network ("LAN") 211, or the like, to facilitate the storage of data in, and/or retrieval of data from, a database 213, in an embodiment. In one instance the database 213 may comprise a relational database management system database. The network 207 may comprise any one of a number of network links, such as for example, but not limited to, the Internet, a wide area network ("WAN"), a LAN, an intranet, or the like, and may include physical connections such as wires, cables, optical fibers, or the like, and/or transceivers capable to receive and/or transmit wireless communications (e.g., transmitted through the atmosphere), in various embodiments.

In one embodiment, the UI may be communicated to the client 203, from the application server 205, as a series of hypertext markup language ("HTML") documents capable of being processed in conjunction with a browser application executable by the client 203. The communication of the UI from the application server 205 to the client may be facilitated by a communication protocol such as hypertext transfer protocol ("HTTP"), or other suitable communication protocol, in an embodiment. The UI may include, in an embodiment, a plurality of UI displays configured to receive a user input to define one or more instances of a time-based organization hierarchy (e.g., the organization hierarchy 101, FIG. 1) in accordance with an embodiment of the present invention, as will be discussed in greater detail hereinafter. In addition, embodiments of the present invention may allow the user to track historical transactions, quotas, and/or territories to facilitate retroactive calculations in response to adjustments of sales data inputs. It will be appreciated that in one embodiment of the invention, the methodologies may be implemented via a distributed processing environment including multiple clients and/or servers.

Figure 3:
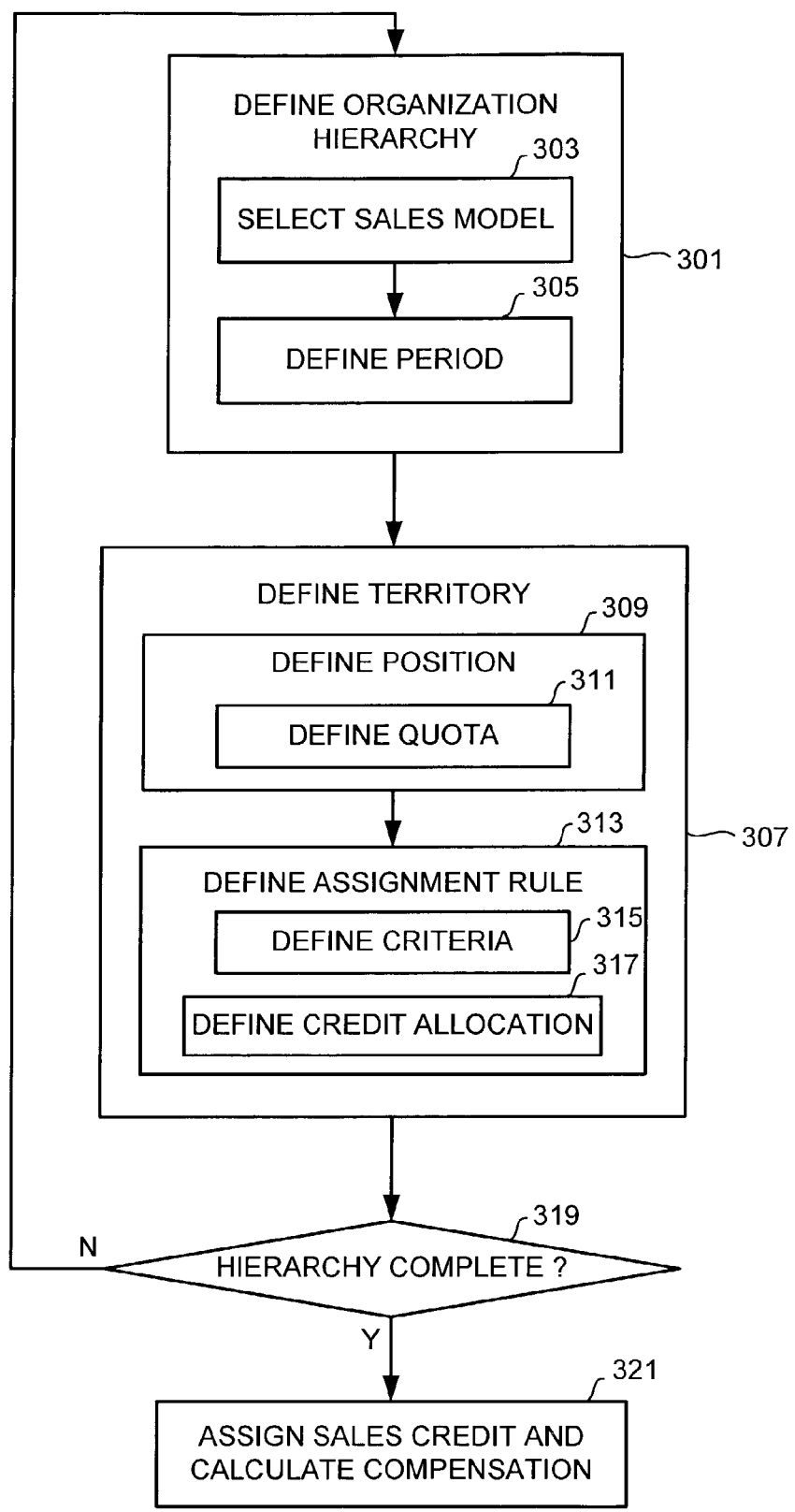
FIG. 3 is a flow diagram illustrating an embodiment of a flow of events in an example definition process in accordance with an embodiment of the present invention.

With reference now primarily to FIG. 3, an embodiment of a flow of events in an example definition process is shown in accordance with an embodiment of the present invention. As the following discussion proceeds with regard to FIG. 3, reference is made to FIGS. 4-8C to illustrate various aspects of embodiments of the present invention. As used herein, "user" is intended to refer to any one or more persons, computer operators, or the like, implementing the methodologies of embodiments of the present invention.

As a starting point, the user may define a first instance of the time-based organization hierarchy (e.g., the organization hierarchy 101, FIG. 1) (see, e.g., process block 301) to include one or more nodes, such as those described above, and illustrated in FIG. 1. In one embodiment, the user may define the first instance of the time-based organization hierarchy 101 via a UI display, as discussed above, such as that illustrated in FIG. 4.

Figure 4:
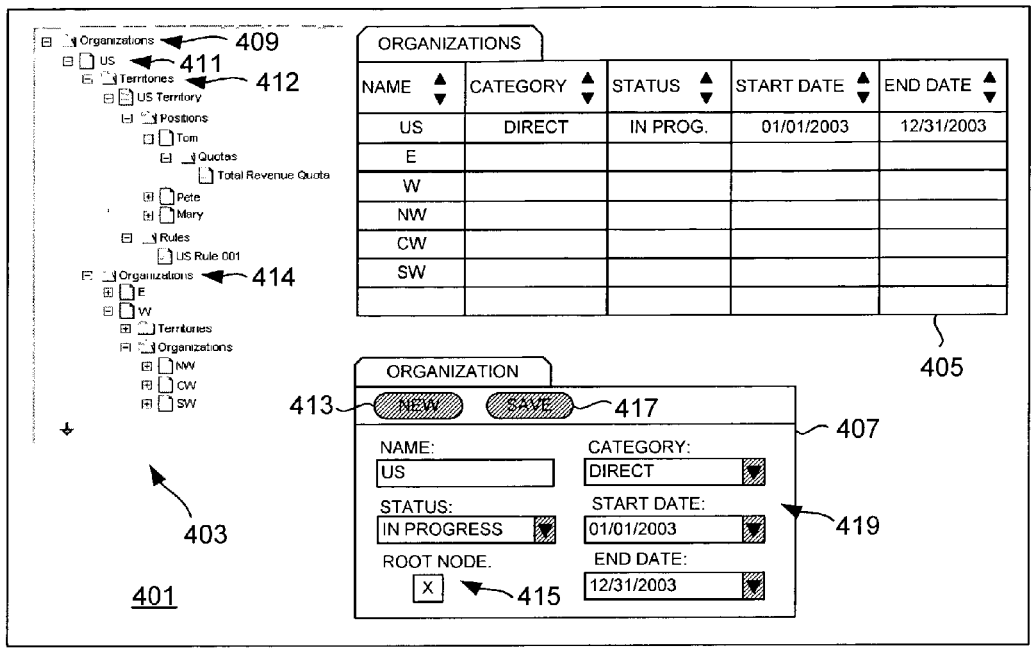
FIG. 4 is an illustration of an example screen display showing an embodiment of a user interface ("UI") display configured to define and manage nodes of an example organization hierarchy in accordance with an embodiment of the present invention.

FIG. 4 is an illustration of an example screen display showing an embodiment of an organization view UI display 401 configured to define and manage nodes of an example organization hierarchy (e.g., the organization hierarchy 101, FIG. 1) in accordance with an embodiment of the present invention. The organization view UI display 401 includes an organization tree applet 403 to display a visual representation of the relationship among the plurality of nodes of the organization hierarchy 101 and the elements associated with each node. In addition, the organization view UI display 401 may include an organization list applet 405, and an organization form applet 407, in an embodiment.

The organization tree applet 403 may, in one embodiment, include a plurality of folders (e.g., an organizations folder 409), and a plurality of corresponding records (e.g., a US record 411). It will be appreciated that the folders are merely a mechanism for organizing the records contained therein, and need not be present in all embodiments of the present invention. It will also be appreciated that the organization tree applet 403 illustrated in FIG. 4 and throughout the figures includes folders and/or records that would not be present at all stages of the definition process illustrated in FIG. 3, but would be added progressively as the hierarchy is defined by the user. For example, as a starting point, only the organizations folder 409 may be present in the organization tree applet 403. When the user creates the first record (e.g., the US record 411), then additional folders (e.g., a territories folder 412 and a secondary organizations folder 414) may be created in an embodiment.

Similarly, when records are created in the new folders (e.g., folders 412 and 414), respectively, then additional folders corresponding to those records will also be created in the organization tree applet 403, and so on. Each record and/or folder may be selected to show the folders and/or records contained therein. In this regard, it will also be appreciated that other records and/or folders corresponding to the "E" organization record, the "W" organization record, and the like, like those described above, are not shown in the organization tree applet 403 as illustrated in the figures, but may be accessed by the user by expanding (e.g., via selection thereof) those particular records.

As mentioned above, in one embodiment, when the user first accesses the organization view UI display 401, only a single folder (e.g., the top-most "organizations" folder 409) may be displayed in the organization tree applet 403. In order to define a first instance of the time-based organization hierarchy, the user may select the single folder (e.g., the "organizations" folder 409) and create a new organization record (by user selection of the "NEW" button 413) by entering data into the data fields 419 of the organization form applet 407. For example, the user may enter a "Name" for the organization record, such as "US," a "Category" (also "sales model") for the organization hierarchy (see, e.g., process block 303, FIG. 3), such as "Direct," and select a status, such as "In Progress," as well as a "Start Date" and an "End Date" for an effective period (see, e.g., process block 305, FIG. 3) that will correspond to the time-based organization hierarchy. Because this first organization represents the root node (see, e.g., the primary node 103, FIG. 1), an indicator 415 identifying this characteristic may appear on the organization form applet 407, in an embodiment. When all of the requisite information has been entered into the data fields 419 of the organization form applet 407, the user may select a "SAVE" button 417 to create an organization record (e.g., the organization record 411) corresponding to the data entered by the user. The organization record 411 may then appear in the organization tree applet 403 and in the organizations list applet 405, in an embodiment. It will be appreciated that with each "SAVE," the preceding information input by the user may be communicated to the application server 205 (see, e.g., FIG. 2) via the network 207 and ultimately to the database server 209 to facilitate storage of the information/data in the database 213.

As indicated above, the user may specify a "Name" for the organization record. The name may be chosen at the user's discretion, but for purposes of clarity, may correspond to a territory definition that will be created by the user, as discussed hereinafter. The "Category," or sales model, for the instance of the organization hierarchy may be selected by the user (see, e.g., block 303, FIG. 3) from a predefined list of values, such as direct sales (also "Direct"), service, product specialist, channel, inside sale, and global account, or the like, in an embodiment. It will be appreciated that these distinctions (i.e., sales models) may be used to define a relationship among participants in an organization hierarchy (e.g., between nodes). The terms used to correspond to the various sales models may be arbitrarily chosen to indicate a particular sales structure within an organization. The particular terms chosen and used herein generally describe business models used in industry, thereby enabling companies to more accurately label these hierarchy instances, but other terms may be used depending on the specific desires of the user.

The "Status" field of the organization form applet allows the user to select from a predefined list of values regarding the status of the organization hierarchy. When the hierarchy is being created, the "Status" will remain "In Progress." Other options may include "Submitted" (as part of an approval process), "Approved," and/or "Expired." In one embodiment, the organization form applet 407 may include data fields (not shown) in which the user may specify the date on which the organization hierarchy was submitted for review and approval, and to whom it was submitted to facilitate tracking within the company.

The "Start Date" and the "End Date" fields (of the organization form applet 407) correspond to an effective period for the organization hierarchy. In one embodiment in accordance with an embodiment of the present invention, only a single instance of a particular category (e.g., sales model) of organization hierarchy may be effective during any given calendar period. As such, the start date of a second instance of the organization hierarchy must be no earlier in time than the day following the end date of the first instance of the organization hierarchy. It will be appreciated however, that multiple instances of an organization hierarchy, each corresponding to a different category, may have overlapping effective periods, in an embodiment.

Continuing with the foregoing example, and with continued reference to FIG. 3, the user may next define a territory (see, e.g., process block 307) to correspond to the primary node (e.g., the US record 411) defined above. In one embodiment, the user may define the territory via a territory view UI display, such as that illustrated in FIG. 5. In one embodiment, user actuation of the "SAVE" button 417 (see, e.g., FIG. 4) to save the US record 411, may cause the territories folder 412 and the secondary organizations folder 414 to be created in the organization tree applet 403. User selection of the territories folder 412 may cause the territory view UI display 501 of FIG. 5 to be displayed by the client (e.g., the client 203, FIG. 2), in an embodiment.

Figure 5:
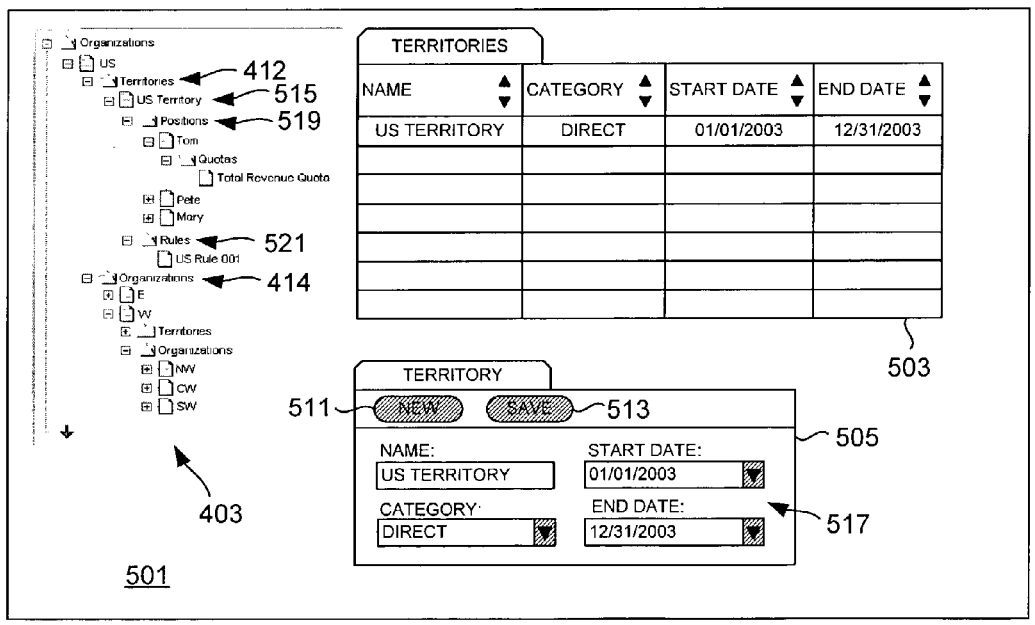
FIG. 5 is an illustration of an example screen display showing an embodiment of a UI display configured to define and manage territories of an example organization hierarchy in accordance with an embodiment of the present invention.

In one embodiment, the territory view UI display 501 of FIG. 5 includes the organization tree applet 403, as well as a territory list applet 503 and a territory form applet 505. In order to define a new territory, the user may select a "NEW" button 511 on the territory form applet 505. The user may, in an embodiment, enter information into the data fields 517 of the territory form applet 505 to define the territory corresponding to the previously defined node (e.g., the US record 411, FIG. 4; primary node 103, FIG. 1). The "Name" of the territory (e.g., "US Territory") may be selected from a pick-list, in an embodiment, of available territories defined by a compensation administrator, for example. The user may also select a "Category" such as "Direct" as well as a "Start Date" and an "End Date." In one embodiment, the "Category" for the territory will be predefined to match the "Category" field selected for the corresponding node (e.g., the US record 411, FIG. 4), and the "Start Date" and "End Date" may be selected to fall within the period defined by the "Start Date" and "End Date" selected for the organization hierarchy instance (e.g., the "Start Date" and "End Date" defined for the primary node of the organization hierarchy) with which the territory is associated.

When all of the requisite information has been entered into the data fields 517 of the territory form applet 505, the user may save the defined territory by selecting a "SAVE" button 513 to add a territory record 515 (also "US Territory record") to the organization tree applet 403, and to the territory list applet 503, in an embodiment. In a manner similar to that described above in conjunction with FIG. 4, user actuation of the "SAVE" button 513 to save the US Territory record 515 may cause a positions folder 519 and a rules folder 521 to be created in the organization tree applet 403. In one embodiment, territory definitions may be reused in different organization hierarchies, or in different instances of an organization hierarchy, thereby reducing administrative effort and improving system performance in regard to the creation of new organization hierarchies.

Continuing with the foregoing example, and with continued reference to FIG. 3, the user may next define one or more positions (see, e.g., process block 309) to correspond to the previously defined territory (e.g., the US Territory record 515, FIG. 5). In one embodiment, user selection of the positions folder 519 may cause a positions view UI display, such as that illustrated in FIG. 6, to be generated by the client (e.g., the client 203, FIG. 2).

Figure 6:
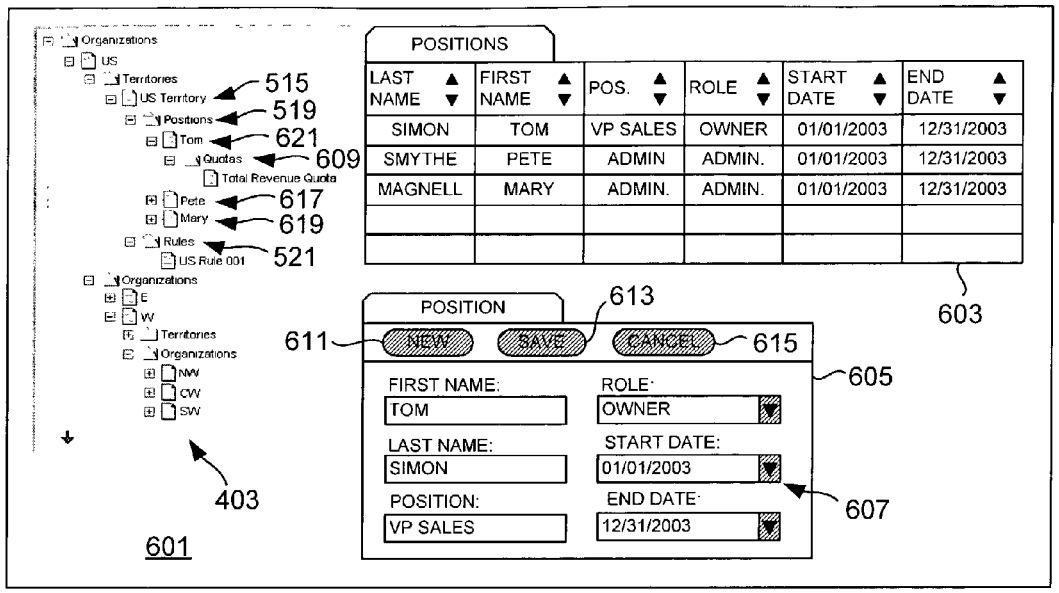
FIG. 6 is an illustration of an example screen display showing an embodiment of a UI display configured to define and manage positions of an example organization hierarchy in accordance with an embodiment of the present invention.

With reference now primarily to FIG. 6, the positions view UI display 601 includes, in one embodiment, the organization tree applet 403, as well as a positions list applet 603 and a position form applet 605 to receive a user input to define at least one position (see, e.g., block 309, FIG. 3) associated with the territory (e.g., the US Territory record 515) described above. In one embodiment, the user may define a position to correspond to the territory (e.g., the US Territory record 515) by selecting a "NEW" button 611 on the position form applet 605. The user may then enter information into the data fields 607 of the position form applet 605. For example, the user may select an individual (e.g., having a first name, last name, and company position) from a pick-list of available positions that may be assigned to a given level of the organization hierarchy, in an embodiment. For instance, in the present example, the Vice President of Sales, Tom Jefferson, may be selected as the position for which sales credit will be assigned, and compensation calculated, in regard to the defined node (e.g., the US record 411, FIG. 4) of the particular instance of the time-based organization hierarchy with which the position is associated (the position may actually be associated with the territory, and the territory corresponds to the node in the organization hierarchy).

In addition, a "Role" may be selected for the position, such as "Owner" or "Administrator." In one embodiment, only a single "Owner" position may correspond to any given territory (e.g., the US Territory record 515), but multiple "Administrator" positions may also be defined for the territory to allow multiple individuals to access and oversee the organization hierarchy, to the extent that it is accessible from any given node or organization record within the hierarchy. For instance, two example "Administrator" position records 617 and 619 are illustrated in the organization tree applet 403 corresponding to the defined territory (e.g., the US Territory record 515).

In one embodiment, the "Administrator" positions are configured to grant users access to the organization hierarchy only for the purpose of editing and/or managing the definition of lower levels of the organization hierarchy. For example, a user accessing the organization hierarchy via an "Administrator" position defined to correspond to the primary node 103 (see, e.g., FIG. 1) may define elements of the secondary nodes 105, 107 (see, e.g., FIG. 1) and/or the tertiary nodes 109-119 (see, e.g., FIG. 1), in an embodiment. In contrast, a user accessing the organization hierarchy via an "Administrator" position defined to correspond to the first secondary node 105 (see, e.g., FIG. 1) may define elements of the tertiary nodes 109-113 (see, e.g., FIG. 1) directly stemming therefrom and any child nodes of the tertiary nodes 109-113 (see, e.g., FIG. 1). It will be appreciated that "Administrator" positions need not necessarily be defined for all territories, and, in one embodiment, serve only an administrative purpose and are not assigned sales credit in response to a sales data input, as will be discussed in greater detail hereinafter. In addition to the foregoing, a "Start Date" and an "End Date" may also be defined for the position. In one embodiment, the "Start Date" and the "End Date" will fall within the period defined by the "Start Date" and the "End Date" defined for the territory, as described above in conjunction with FIG. 5.

When all of the requisite information has been entered by the user, the user may save the defined position by selecting a "SAVE" button 613 on the position form applet 605 to create a position record 621 corresponding to the defined position in the organization tree applet 403, and in the positions list applet 603, in an embodiment. It will be appreciated that the user may cancel positions from the territory (e.g., the US Territory record 515), in an embodiment, by identifying the position in the positions list applet 603 (via a cursor for example), and selecting a "CANCEL" button 615 on the position form applet 605. In a manner similar to that described above in conjunction with FIG. 4, user actuation of the "SAVE" button 613 to save the position record 621 may cause a quotas folder 609 to be created in the organization tree applet 403, in a manner similar to that described above.

With continued reference to the foregoing example, and to FIG. 3, the user may next define a quota (see, e.g., process block 311) to correspond to the previously defined position (see, e.g., the Tom record 621, FIG. 6). In one embodiment, user selection of the quotas folder 609 may cause a quotas view UI display, such as that illustrated in FIG. 7, to be generated by the client (e.g., the client 203, FIG. 2).

Figure 7:
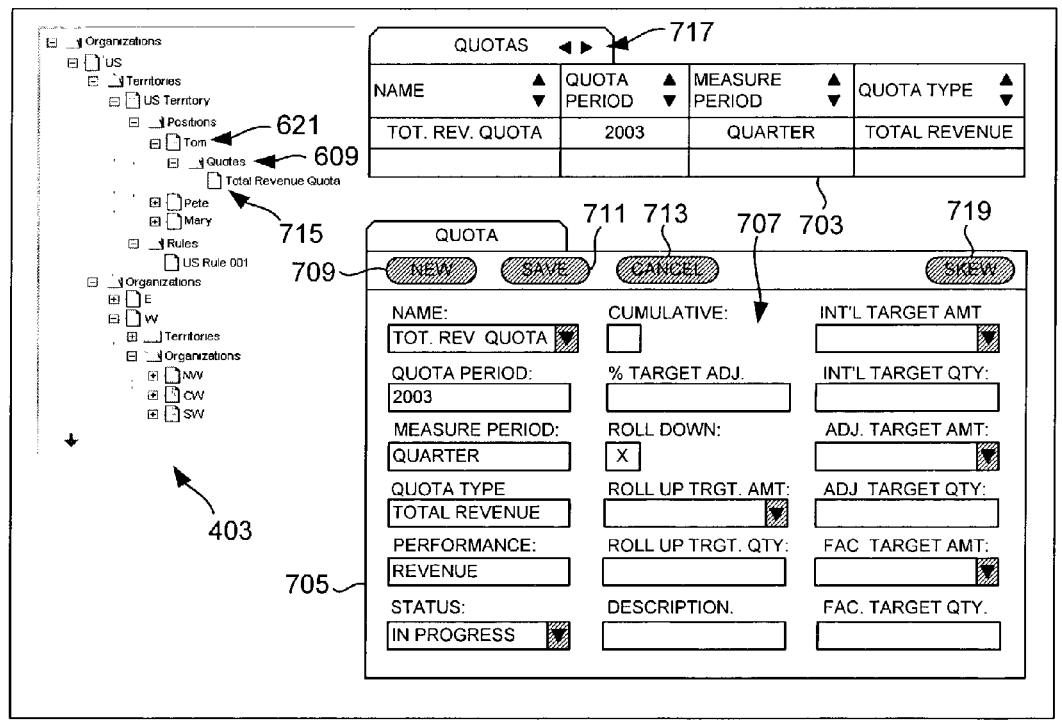
FIG. 7 is an illustration of an example screen display showing an embodiment of a UI display configured to define and manage quotas of an example organization hierarchy in accordance with an embodiment of the present invention.
Figures 7A, 8:
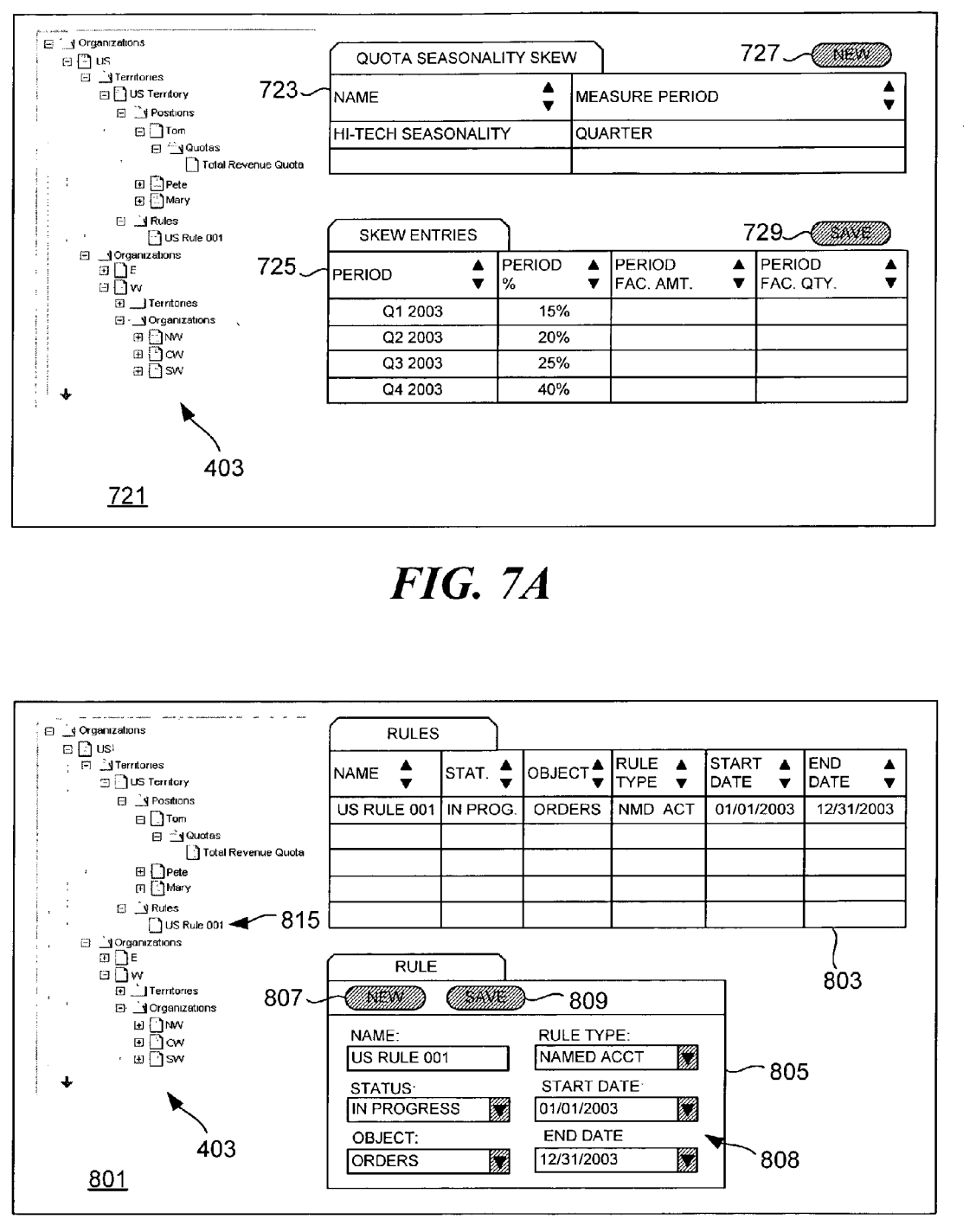

With reference now primarily to FIG. 7, the quotas view UI display 701 includes, in one embodiment, the organization tree applet 403, as well as a quotas list applet 703 and a quota form applet 705 to receive a user input to define a quota (see, e.g., block 311, FIG. 3) to correspond to the defined position (e.g., the Tom record 621) described above. In one embodiment, the user may define a quota to correspond to the position (e.g., the Tom record 621) by selecting a "NEW" button 709 on the quota form applet 705. The user may then enter information into the data fields 707 of the quota form applet 705, in an embodiment.

For example, the user may specify a "Name" for the quota, identify a "Quota Type" such as a "Total Revenue Quota," define a "Quota Period" such as a year (e.g., 2003) and a "Measure Period" such as a quarter, month, or the like, and a "Performance Measure" such as revenue or product quantity. In addition, the user may also specify an "Initial Target Amount" and/or "Initial Target Quantity," an "Adjusted Target Amount" and/or "Adjusted Target Quantity," as well as a "Factored Target Amount" and/or "Factored Target Quantity," in an embodiment. The "Initial Target Amount" and/or "Initial Target Quantity" corresponds to the starting target in revenue amount or quantity of the employee on this Quota, in an embodiment. The "% Target Adjustment field contains a percentage to apply to an employee's initial target amount. The Adjusted Target Amount is updated for the employee on this Quota. The "Factored Target Amount" and/or "Factored Target Quantity" corresponds to the amount of the target after the factors have been applied by a manager. In one embodiment, the factored target starts with the adjusted target amount, then is changed based on the factors.

In addition to the foregoing, the user may specify a "Status" of the quota, as described previously, as well as a "Roll Up Target Amount," and a "Roll Up Target Quantity." final amount after the manager has adjusted and applied factors to employee's quotas. The user may also indicate whether the defined quota is intended to be cumulative. For example, if a "Cumulative" indicator (e.g., on the quota form applet 705) is selected by the user, the quota will accumulate from previous measure periods into the current measure period. For example, Q2 quota amount is the sum of Q1 and Q2, in an embodiment. The user may also indicate whether the defined quota is to be rolled down. For example, if a "Roll Down" indicator on the quota form applet 705 is selected by the user, the quota will be divided among the nodes (e.g., the secondary nodes 105, 107, FIG. 1) immediately below the node (e.g., the primary node 103, FIG. 1) to which the quota corresponds.

In one embodiment, the user may also enter a "Description" of the quota for administrative purposes. When all of the requisite information has been entered, the user may create a new quota record by selecting a "SAVE" button 711 on the quota form applet 705. The new quota record (e.g., the Total Revenue Quota record 715) may then be created in the organization tree applet 403 and in the quotas list applet 703, in an embodiment. The reader will note that not all of the data fields 707 of the quota form applet 705 are displayed in the quotas list applet 703 in the illustrated embodiment. However, in one embodiment, the user may view additional fields in the quotas list applet 703 by scrolling the display of the quotas list applet 703 via actuation of a pair of arrows indicated by reference numeral 717.

In some cases, the user may desire to apply a seasonality skew to the quota to accommodate different conditions in the market. In one embodiment, the user may define the seasonality skew by selecting a "SKEW" button 719 on the quota form applet 705. For example, and with reference primarily to FIG. 7A, a seasonality skew view UI display 721 includes, in one embodiment, the organization tree applet 403, as well as a quota seasonality skew list applet 723 and a skew entries list applet 725. In one embodiment, the user may create a new seasonality skew by selecting a "NEW" button 727, and entering a "Name" and "Measure Period" for the seasonality skew in the quota seasonality skew list applet 723. The user may also select a previously defined seasonality skew from the quota seasonality skew list applet 723, in an embodiment. For example, a seasonality skew defined for a parent node (e.g., the primary node 103, FIG. 1) may be available for selection to correspond to a quota associated with a child node (e.g., the secondary node 105, 107, FIG. 1). The "Measure Period" of the seasonality skew may correspond to the "Measure Period" of the quota to which the seasonality skew is to refer. The user may then define different percentages, different amounts, and/or different quantities for each period corresponding to the defined quota. When the requisite information has been entered, the user may save the seasonality skew by selecting the "SAVE" button 729, in an embodiment.

With continued reference to the foregoing example, and to FIG. 3, the reader will recall that in addition to the positions folder 519 (see, e.g., FIG. 6), the rules folder 521 (see, e.g., FIG. 6) was also created in the organization tree applet 403 in response to a user action to save the defined territory (e.g., the US Territory record 515, FIG. 5). In one embodiment, the user may next define an assignment rule (see, e.g., process block 313) to correspond to the previously defined territory (e.g., the US Territory record 515, FIG. 5). In a manner similar to user selection of the positions folder 519, user selection of the rules folder 521 from the organization tree applet 403 may cause a rules view UI display, such as that illustrated in FIG. 8, to be generated by the client (e.g., the client 203, FIG. 2), in an embodiment.

With reference now primarily to FIG. 8, the rules view UI display 801 includes, in one embodiment, the organization tree applet 403, as well as a rules list applet 803 and a rule form applet 805 configured to receive a user input to define an assignment rule to correspond to the defined territory (e.g., the US Territory 515, FIG. 5) described above. In one embodiment, the user may define an assignment rule to correspond to the territory (e.g., the US Territory record 515, FIG. 5) by selecting a "NEW" button 807 on the rule form applet 805. The user may then enter information into the data fields 808 of the rule form applet 805.

For example, the user may specify a "Name" for the rule such as "US Rule 001," a "Status," as described above, an "Object" against which the rule will be compared, as well as a "Rule Type," such as product, vertical, named account, and/or geographic, and a "Start Date" and an "End Date." In one embodiment, the "Start Date" and the "End Date" will fall within the calendar period defined by the "Start Date" and the "End Date" defined for the corresponding territory record (e.g., the US Territory record 515, FIG. 5). When all of the requisite information has been entered, the user may create a new rule record by selecting a "SAVE" button 809 on the rule form applet 805.

In one embodiment, user actuation of the "SAVE" button 809 on the rule form applet 805 may cause generation of a secondary rules view UI display, such as that illustrated in FIG. 8A or 8B. It will be appreciated that the UI displays illustrated in FIGS. 8A and 8B are identical, except for the tab selection (e.g., FIG. 8A shows a display corresponding to a Criteria tab 816, while FIG. 8B shows a display corresponding to a Credit Allocations tab 819) and corresponding display in the list applet 813. The secondary rules view UI display of FIGS. 8A and 8B may also include an assignment rule form applet 811, showing the data corresponding to the current rule that was previously entered by the user in the rule form applet 805 of FIG. 8.

With continued reference to the foregoing example, and to FIG. 3, the user may next define criteria (see, e.g., process block 315), and a credit allocation (see, e.g., process block 317) to correspond to the previously defined assignment rule (e.g., the US Rule 001 record 815).

With reference first to FIG. 8A, the user may specify a criteria (e.g., Country, State, or the like) against which a comparison will be made in order to facilitate sales credit assignment in association with the defined rule (e.g., the US Rule 001 record 815). The user may also specify a comparison method (e.g., Compare to Object) to identify the input source against which the comparison is to be made (in this case, an Order, as specified in the rule form applet 805 "Object" data field). In addition, the user may specify a value (e.g., Country=US) that may cause the condition created by the defined rule (e.g., the US Rule 001 record 815) to be "TRUE." In one embodiment, when all requisite information has been entered, the user may select a "SAVE" button 817, and then select the Credit Allocations tab 819 to view the display illustrated in FIG. 8B, for example.

With reference now primarily to FIG. 8B, the user may specify a position (e.g., the Tom record 621) corresponding to the defined territory (e.g., the US Territory record 515) with which the defined rule (e.g., the US Rule 001 815) is associated. In addition, the user may specify a "Start Date" and an "End Date" for the credit allocation, and a "Credit Split" (i.e., the percentage of sales credit for a particular transaction that will be assigned to the position if the condition associated with the corresponding rule is "TRUE"). In one embodiment, the "Start Date" and the "End Date" may fall within the calendar period defined by the "Start Date" and the "End Date" defined for the corresponding rule record (e.g., the US Rule 001 record 815).

With continued reference to the foregoing example, and to FIG. 3, when the user has finished defining the elements described above and illustrated by process blocks 301-317, a determination is made regarding whether the time-based organization hierarchy is complete (see, e.g., process block 319). If the organization hierarchy is not yet complete (e.g., additional nodes and/or territories need to be defined to complete the hierarchy), then the process illustrated in FIG. 3 may enter an iterative loop beginning again with process block 301. For example, in one embodiment, an individual associated with the first secondary node 105 (see, e.g., FIG. 1) may take on the role of the user to define the next node in the organization hierarchy and a corresponding territory, along with the other elements described above. In another embodiment, a single user may define the entire time-based organization hierarchy.

It will also be appreciated that, in one embodiment, all of the nodes of the organization hierarchy (e.g., the organization hierarchy 101, FIG. 1) may be defined first (see, e.g., block 301, FIG. 3), followed by all of the territories (see, e.g., block 307, FIG. 3), and so on, so that a single iteration of the definition process illustrated in FIG. 3 will result in a completely defined organization hierarchy. When the entire time-based organization hierarchy has been defined, as determined at process block 319 (see, e.g., FIG. 3), then the completed time-based organization hierarchy may be created and implemented, via a computer system for example, to assign sales credit and calculate compensation (see, e.g., process block 321) in response to a sales data input associated with a transaction.

With reference now primarily to FIG. 9, an embodiment of a flow of events in an example sales-based compensation process is shown in accordance with an embodiment of the present invention. In the embodiment illustrated in FIG. 9, a transaction (e.g., an order corresponding to a sale of a product or service) may be received by a computer system (via user input for example) such as the client 203 (see, e.g., FIG. 2) (see, e.g., process block 901). A sales data input, including information corresponding to the transaction such as an order date, amount, quantity, location, and the like, may then be imported to a server, for example (e.g., the application server 205, FIG. 2) (see, e.g., process block 903). The server may then process the sales data input in conjunction with one or more instances of an organization hierarchy (e.g., the organization hierarchy 101, FIG. 1) to assign and/or audit sales credit (see, e.g., process block 905) to correspond to one or more defined positions in response to one or more assignment rules.

At this point, the user may monitor his or her (or another's) achievement and attainment (e.g., how much of a node owner's quota has been fulfilled for a specified attainment period) (see, e.g., process block 907) corresponding to a position in the organization hierarchy, and compensation may be calculated based on the current sales credit assigned to any given position (see, e.g., process block 909). An achievement and attainment monitoring process, and a compensation calculation process are described in greater detail in co-pending U.S. patent application Ser. No. 10/273,632, filed Oct. 18, 2002, and titled METHOD AND SYSTEM FOR MONITORING ACHIEVEMENT AND ATTAINMENT AND CALCULATING COMPENSATION VIA TIME-BASED ORGANIZATION HIERARCHIES, incorporated herein by reference.

In some cases, elements of the transaction (e.g., the amount of the transaction) may change from the time the transaction is first received, and the time it is invoiced and/or fully executed. In these cases, sales credit may be assigned based on the sales data input corresponding to the transaction, but may need to be adjusted to properly account for the net change in the transaction (e.g., the amount of the order may have increased, and the salespersons should be compensated accordingly). In order to effectively account for these changes, the system of an embodiment of the present invention may monitor the transaction for a net change (see, e.g., process block 911), and if a change is detected (see, e.g., process block 913), the sales credit may be re-assigned (see, e.g., block 905), and the process may enter an iterative loop so long as such changes continue to be detected.

By using the effective period defined for each instance of the organization hierarchy, retroactive transactions can accurately and automatically be processed using the instance of the organization hierarchy that was effective at the right point in time, thereby reducing or eliminating manual adjustments that are both error prone and time consuming. When no net change is detected (see, e.g., block 913), then the process begins anew with the receipt of a subsequent transaction (see, e.g., block 901) via another sales data input.

As will be appreciated, the assignment of sales credit to positions within an instance of the time-based organization hierarchy, as described above, is an important part of any sales-based compensation process. Properly crediting individuals for their respective roles in association with a transaction ensures that sales representatives and others within an organization can focus their attention on selling products and/or services, and not waste time tracking their sales credits through a cumbersome sales-based compensation process.

With reference now primarily to FIG. 10, a flow diagram illustrating an embodiment of a flow of events in an example sales credit assignment process 905 is shown in accordance with an embodiment of the present invention. In one embodiment, assigning and/or auditing sales credit in conjunction with a sales data input includes performing an assignment rule evaluation (see, e.g., process block 1001) and generating an assignment object record (see, e.g., process block 1003). A flow diagram illustrating an embodiment of a flow of events in an example assignment rule evaluation process is shown in FIG. 11 in accordance with an embodiment of the present invention. Similarly, a flow diagram illustrating an embodiment of a flow of events in an example assignment object record generation process is shown in FIG. 12 in accordance with an embodiment of the present invention. As the following discussion proceeds with regard to FIGS. 11 and 12, reference is made to FIGS. 13 and 14 to illustrate various aspects of embodiments of the present invention.

With reference now primarily to FIG. 11, the assignment rule evaluation process 1001 begins, in one embodiment, with a selection of a sales model (see, e.g., process block 1101). The reader will recall that each instance of the time-based organization hierarchy defined in accordance with an embodiment of the present invention may include an indication of (e.g., via a user input) a corresponding sales model. The selection of the sales model (see, e.g., block 1101) may comprise a user input, in one embodiment, or may be implemented automatically based on a user-specified preference (e.g., iterate through the assignment rule evaluation process 1001 first for organization hierarchy instances having a corresponding sales model="Direct," then "Service," "Product Specialist," "Channel," and so on). In effect, the selection corresponds to selection of an instance of the time-based organization hierarchy having the effective period corresponding to the order date included in the sales data input.

Following selection of the sales model (see, e.g., block 1101), the process 1001 proceeds, in one embodiment, to identify all assignment rules having an effective period corresponding to the order date (e.g., as specified in the sales data input) and corresponding to the selected sales model (see, e.g., process block 1103). For example, if the order date is Mar. 1, 2003, then all assignment rules corresponding to an instance of the time-based organization hierarchy having an assignment rule effective period that includes the order date (e.g., a "Start Date" of Jan. 1, 2003, and an "End Date" of Dec. 31, 2003), and corresponding to the selected sales model, will be identified. In practice, assignment rules from only a single instance of the time-based organization hierarchy will be identified because only a single instance of the time-based organization hierarchy corresponding to a specific sales model (e.g., Direct) may be effective for any specific calendar period (i.e., the effective period of the organization hierarchy). As the reader will recall however, assignment rules associated with the instance of the time-based organization hierarchy may have an effective period themselves, but the effective period of the assignment rules must fall within the effective period defined for the instance of the organization hierarchy, in an embodiment. Therefore, in one embodiment, some assignment rules may have an effective period corresponding to the order date, while others may not, even though all of the assignment rules come from an instance of the time-based organization hierarchy with an effective period corresponding to the order date.

At this point in the process 1001, a condition regarding whether a starting territory has been defined for the selected sales model may be evaluated (see, e.g., process block 1105), in an embodiment. In one embodiment, a starting territory may be specified by the user to indicate that only a subset of all assignment rules within the instance of the organization hierarchy should be considered. If a starting territory has been defined for the selected sales model (e.g., as determined by block 1105), then a rule set may be created including all identified assignment rules corresponding to the node of the instance of the organization hierarchy that corresponds to the specified territory, and all identified assignment rules corresponding to descendant nodes of the node (corresponding to the specified territory) (see, e.g., process block 1107), in an embodiment. If no starting territory has been defined (or if the defined starting territory corresponds to the root node of the instance of the organization hierarchy), then a rule set may be created including all identified assignment rules corresponding to all nodes of the instance of the organization hierarchy, in an embodiment.

For example, and with reference to FIG. 13, an illustration depicting an example rule set 1301 is shown in accordance with an embodiment of the present invention. It will be appreciated that the rule set 1301 illustrated in FIG. 13 is intended as an example only, and that a greater or lesser number of assignment rules may be included in other rule sets. In one embodiment, the "Hierarchy Name" associated with each assignment rule in the rule set 1301 may correspond to the "Name" of the root node organization (see, e.g., the organization form applet 407, FIG. 4) of the instance of the time-based organization hierarchy with which the identified assignment rules are associated.

At this point in an embodiment of the assignment rule evaluation process 1001, the assignment rules of the rule set created at process block 1107 or 1109, as described above, may be labeled (or tagged) with a sequence number to generate a rule list (see, e.g., process block 1111). In one embodiment, the sequence number may correspond to at least one assignment rule attribute. In one embodiment, the assignment rule attribute may comprise at least one of a rule type priority number, a lowest level flag, or a hierarchy level indicator. The rule type priority number may be, in an embodiment, a user-specified number (e.g., 1, 2, 3, 4 . . . ) that corresponds to a specified type of assignment rule (e.g., named account, vertical, product, geographic, or the like). Because the "Rule Type" of each identified assignment rule (see, e.g., the rule form applet 805, FIG. 8) is a text field, sorting is facilitated by creating a unique priority number to correspond to each type of assignment rule, in an embodiment. For example, the "Named Account" rule type may correspond to a rule type priority number of 1, the "Vertical" rule type may correspond to a rule type priority number of 2, and so on, in one embodiment.

In one embodiment, the lowest level flag will be either "TRUE" or "FALSE." The lowest level flag will be "TRUE" when the assignment rule with which the flag is associated, corresponds to a node at the lowest level (e.g., the tertiary nodes 109-119 of FIG. 1 form the lowest level of the organization hierarchy 101) of the instance of the organization hierarchy, in an embodiment. In all other cases, the lowest level flag will be "FALSE." Similarly, the hierarchy level indicator ("Level" in FIGS. 13 and 14) references, in an embodiment, the specific level of the instance of the time-based organization hierarchy to which the assignment rule corresponds.

In one embodiment, and as indicated by the example rule list 1401 illustrated in FIG. 14, sorting the identified assignment rules by rule attributes, and tagging each assignment rule with a sequence number comprises tagging all assignment rules with the highest rule type priority number (e.g., "1") and having the lowest level flag="TRUE" with a starting sequence number (e.g., "1"). Next, all assignment rules with the highest rule type priority number, the lowest level flag="FALSE," and the highest hierarchy level indicator (e.g., "3" in FIG. 13) (Note: there are no assignment rules having both a rule type priority number of 1 and a lowest level flag="TRUE" that have a hierarchy level indicator greater than "3" in the rule set illustrated in FIG. 13) may be tagged with an incremented sequence number (e.g., "2"). This process may then be reiterated for each group of assignment rules with the highest rule type priority number, the lowest level flag="FALSE," and the next highest hierarchy level indicator (e.g., "2," then "1"), tagging each respective group of assignment rules with the next increment of the sequence number (e.g., "3," and then "4") until all hierarchy levels of the instance of the organization hierarchy have been exhausted.

In one embodiment, the entire sequence number labeling process may then repeat itself for those identified assignment rules having the next highest rule type priority number (e.g., "2"), and so on, such that each successive group of assignment rules is tagged with the next successive increment of the sequence number (e.g., "5," "6," "7," and so on) until all of the identified assignment rules in the rule set (see, e.g., FIG. 13) have been tagged with a sequence number, and prioritized according to sequence number to generate the rule list (see, e.g., FIG. 14).

In another embodiment, the sequence number may be determined via a user-specific and/or customizable assignment rule prioritization formula that considers factors in addition to, or different from, the assignment rule attributes described previously. It will be appreciated that in still another embodiment of the present invention, prioritization of assignment rules may be performed via a process prior to performing the assignment rule evaluation. In one embodiment, all assignment rules corresponding to an organization (e.g., assignment rules corresponding to all of a company's time-based organization hierarchies) may be periodically prioritized. Then, in response to a sales data input, all assignment rules corresponding to a selected instance of a time-based organization hierarchy may be identified and evaluated.

With continued reference to FIG. 11, the assignment rule evaluation process 1001 next proceeds, in an embodiment, to evaluate a first rule in the rule list (see, e.g., FIG. 14) (see, e.g., process block 1113). The assignment rule's criteria, comparison method, and value (see, e.g., the list applet 813, FIG. 8A) may be evaluated to determine whether the assignment rule yields a positive result (e.g., rule="TRUE") (see, e.g., process block 1115). If evaluation of the assignment rule yields a positive result (e.g., as determined at block 1115), then the positive assignment rule is passed to the assignment object record generation process 1003 (see, e.g., FIG. 10), an embodiment of which is illustrated in FIG. 12 (see, e.g., process block 1117), and which will be discussed in greater detail hereinafter. The assignment rule evaluation process 1001 then proceeds with evaluation of the next rule in the rule list (see, e.g., process block 1119), if any. If evaluation of the assignment rule yields a negative result (e.g., the rule="FALSE" as determined at block 1115), then the evaluated assignment rule is disregarded, and the assignment rule evaluation process 1001 proceeds to evaluate the next rule in the rule list (see, e.g., block 1119), if any.

Evaluation of the next rule in the rule list (see, e.g., block 1119) begins with a check to determine whether there has been a change in the sequence number from the preceding rule (see, e.g., process block 1121). If the sequence number has changed (e.g., from "1" to "2," or the like), then a determination is made, in an embodiment, regarding whether a prior rule (i.e., evaluated previously) in the rule list has yielded a positive result (e.g., the prior rule="TRUE") (see, e.g., process block 1123). If a prior rule has yielded a positive result (see, e.g., block 1123), then the next rule (i.e., the assignment rule currently being evaluated) is not evaluated further, and the assignment rule evaluation process 1001 proceeds to select another sales model (e.g., "Channel"), if any, and enters an iterative loop beginning again at process block 1103.

If there has been no change in the sequence number (see, e.g., block 1121) or no prior rule has yielded a positive result (see, e.g., block 1123), then the next rule (i.e., the assignment rule currently being evaluated) is evaluated as described above, wherein the assignment rule's criteria, comparison method, and value are considered to determine whether the rule yields a positive result (see, e.g., block 1115). Thus begins an iterative loop until a change in sequence number is detected (see, e.g., block 1121) and a prior rule has yielded a positive result (see, e.g., block 1123), or there is no next rule in the rule list (see, e.g., process block 1118), in which case a determination is made regarding whether a prior rule has yielded a positive result (see, e.g., process block 1120). If a prior rule="TRUE" as determined at process block 1120, then the assignment rule evaluation process 1001 proceeds with selection of another sales model, if any, at process block 1125. If no prior rule has yielded a positive result as determined as process block 1120, then an error may be generated (see, e.g., process block 1122) by the system of an embodiment of the present invention to notify a compensation administrator that the order remains unassigned.

With reference now primarily to FIG. 12, the assignment object record generation process 1003 begins with addition of a territory, position, and specified sales credit, each corresponding to the positive assignment rule (e.g., from process block 1115, FIG. 11) to an assignment record (see, e.g., process block 1201). As discussed previously, each assignment rule corresponds to a territory within the instance of the time-based organization hierarchy. In addition, each assignment rule specifies a position and a credit split (see, e.g., the list applet 813, FIG. 8B). In one embodiment, the credit split (e.g., a percentage), in conjunction with the amount and/or quantity corresponding to the transaction (e.g., as specified in the sales data input), produces the credit allocation (also "sales credit") that is added to the assignment record. For example, 50% of a $10,000 order produces a credit allocation of $5,000 that may be applied against the user-specified quota corresponding to the position as described previously.

Following addition of the territory, position, and sales credit allocation to the assignment record, the assignment object record generation process 1003 may proceed to determine whether an assignment validation mode is active (see, e.g., process block 1203). If the assignment validation mode is active (see, e.g., block 1203), the process 1003 proceeds, in one embodiment, to post the assignment record to an assignment staging table (see, e.g., process block 1205). In one embodiment, assignment records posted to the assignment staging table are subjected to a validation process. For example, a validation can check if assignments are added up to exactly 100% or all assignments come from the lowest level territories. In addition, users can always creating their own validation rule.

If an improper assignment is identified (see, e.g., process block 1207) via the validation process, an error may be generated to notify the compensation administrator, in an embodiment.

If the assignment validation mode is inactive (see, e.g., block 1203), or no improper assignment has been identified for the assignment record in the assignment staging table (see, e.g., block 1207), then the assignment record may be added to an assignment object record corresponding to the transaction (see, e.g., process block 1211), in an embodiment.

As described above, an error may be generated when an transaction (i.e., corresponding to a sales data input) remains unallocated after all identified assignment rules have been evaluated (see, e.g., block 1122, FIG. 11), or if an improper assignment (e.g., over or under 100% allocation, or not assigned to the lowest level in the organization hierarchy) is identified in the assignment validation process (see, e.g., block 1209, FIG. 12). In one embodiment, these evaluations (e.g., for improper assignment, or the like) may comprise validation rules associated with the selected instance of the time-based organization hierarchy. In one instance, the validation rules may be customized by the user. In one embodiment, when the sales credit assignment process (see, e.g., FIG. 10) results in an error, the transaction corresponding to the sales data input that initiated the sales credit assignment process may be added to an assignment error and claiming table, such as that illustrated in FIG. 15.

The assignment error and claiming table 1501 may include, in an embodiment, information such as an order number, an assignment type (e.g., proper, improper, unallocated, or the like), the sales model of the assignment rule evaluation process (see, e.g., FIG. 11) that resulted in the error, and a reason for the error (e.g., not assigned to the lowest level, < or > than 100% allocation, unallocated, or the like). In addition, the assignment error and claiming table 1501 may, in an embodiment, include information such as a status of the order, a priority for dealing with the order, and an indication of the sales team currently assigned to the order (e.g., the positions corresponding to the order's assignment object record), unless the order remains unallocated. In one embodiment, a user-actuateable link (see, e.g., reference numeral 1503) to other members of the currently assigned sales team may be included in the assignment error and claiming table 1501.

In one embodiment, an individual may submit a claiming request to receive sales credit corresponding to orders posted in the assignment error and claiming table 1501. The claiming request may, in an embodiment, be posted to a claim request table 1601, such as that illustrated in FIG. 16, to be considered by a compensation administrator, for example. In some cases, the orders posted to the assignment error and claiming table 1501 of FIG. 15 may be resubmitted to the sales credit assignment process (see, e.g., 905, FIG. 10) after the compensation administrator corrects a deficiency in the sales data input corresponding to the order.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A method comprising:
   instantiating a plurality of instances of a time-based organization hierarchy, wherein
   each instance of the plurality of instances comprises
   a plurality of nodes,
   information regarding a start date for the each instance, and
   information regarding an end date for the each instance, each node of the plurality of nodes of the each instance comprises information regarding a territory of a plurality of territories,
each of the plurality of territories corresponds to a corresponding one of the plurality of nodes of the each instance,
the information regarding the territory comprises
a plurality of positions,
a plurality of quotas, and
one or more assignment rules,
each of the plurality of quotas corresponds to a corresponding position of the plurality of positions,
a respective quota period is defined for the each of the plurality of quotas,
the each instance, in its entirety, is effective only for an effective period defined by the start date and the end date, and
the plurality of instances differ from one another at least by virtue of the effective periods of the plurality of instances not overlapping one another; and
in response to receiving a first sales data input corresponding to a transaction, performing, using a computer processor, an assignment rule evaluation,
wherein
the transaction is associated with an order date, and
the performing the assignment rule evaluation comprises
identifying a single instance of the plurality of instances by determining whether an effective period of the single instance includes the order date,
in response to a determination that the effective period of the single instance includes the order date,
selecting the single instance, in its entirety, from among the plurality of instances,
determining whether a net change in the transaction has occurred, wherein
the transaction credit is applied to at least one quota of the plurality of quotas, and
the at least one quota corresponds to at least one position of the plurality of positions, and
generating a result, wherein
the generating comprises
evaluating at least one assignment rule of the one or more assignment rules of the single instance, wherein
the evaluating comprises
determining whether the at least one assignment rule is applicable to the transaction, and
the evaluating uses information regarding the net change, if the net change in the transaction has occurred, and
evaluating any validation rules associated with the single instance, and
in response to the result being a positive result,
assigning a transaction credit to the at least one position, wherein
the transaction credit corresponds to the transaction, and
the transaction credit is assigned to the at least one position, in a manner specified by the at least one assignment rule.

2. The method of claim 1, further comprising:
in response to receiving a second sales data input corresponding to another transaction,
performing, using the computer processor, another assignment rule evaluation, wherein
the another transaction is associated with another order date, and
the performing the another assignment rule evaluation comprises
identifying another single instance of the plurality of instances by determining whether an effective period of the another single instance includes the another order date, and
in response to a determination that the effective period of the another single instance includes the another order date,
selecting the another single instance, in its entirety, from among the plurality of instances,
generating another result by evaluating at least one assignment rule of one or more assignment rules of the another single instance, and
generating a rule list by labeling each of the at least one assignment rule of one or more assignment rules with a sequence number, and
in response to the another result being the positive result,
assigning another transaction credit to at least one position of the plurality of positions of the another single instance, wherein
the another transaction credit corresponds to the another transaction, and
the another transaction credit is assigned to the at least one position of the another single instance, in a manner as specified by the at least one assignment rule of the another single instance.

3. The method of claim 2, wherein the sequence number corresponds to at least one assignment rule attribute.

4. The method of claim 3, wherein
the at least one assignment rule attribute comprises at least one of
a rule type priority number,
a lowest level flag, or
a hierarchy level indicator, and
the each of the plurality of territories corresponds to one of
a corresponding one of a plurality of geographical territories, or
a corresponding one of a plurality of industry sectors.

5. The method of claim 2, wherein the sequence number is determined via a user-specific assignment rule prioritization formula.

6. The method of claim 1, wherein
the first sales data input comprises
a plurality of orders corresponding to a user-specified date range, and
the user-specified date range corresponding to at least a portion of an effective period of at least one instance of the plurality of instances.

7. The method of claim 1, wherein the assigning the transaction credit comprises:
an assignment record, wherein
the assignment record comprises
a geographical territory,
a position, and
a user-specified sales credit corresponding to the assignment rule; and
adding the assignment record to an assignment object record associated with the transaction.

8. The method of claim 7, further comprising:
validating the assignment record, wherein
the validating returns an error if an improper assignment is identified, the validating is performed prior to the adding the assignment record to the assignment object record, and the validating comprises in response to the improper assignment being identified, preventing the adding the assignment record to the assignment object record.

9. The method of claim 1, further comprising:
instantiating a new instance of the time-based organization hierarchy, wherein
the new instance comprises
a personnel change made to the time-based organization hierarchy since an instantiation of a previous instance of the plurality of instances,
the previous instance, in its entirety, is effective only for a previous effective period,
the new instance, in its entirety, is effective only for a new effective period, and
the new effective period begins after the previous effective period ends.

10. The method of claim 1, wherein the instantiating the plurality of instances further comprises:
for each of the plurality of instances of the time-based organization hierarchy, defining the plurality of nodes, the plurality of territories, the plurality of positions, and the one or more assignment rules of the each of the plurality of instances; and
instantiating the each of the plurality of instances in its entirety.

11. The method of claim 1, wherein the instantiating the plurality of instances further comprises:
instantiating a first subset of the plurality of instances, wherein
the time-based organization hierarchy represents, at least in part, a management structure of an organization,
the time-based organization hierarchy is configured according to a first management structure, and
the structure of each instance of the first subset of the plurality of instances reflects the first management structure;
in response to a change in the management structure of the organization, changing the structure of the time-based organization hierarchy from the first management structure to a second management structure; and
instantiating a second subset of the plurality of instances, wherein
the changing the structure of the time-based organization hierarchy configures the time-based organization hierarchy according to the second management structure, and
the structure of each instance of the second subset of the plurality of instances reflect the second management structure.

12. The method of claim 11, wherein
each of the plurality of territories is defined by a territory definition of a plurality of territory definitions, and
the plurality of territory definitions are configured to be used in instantiating one or more instances of another time-based organization hierarchy.

13. A computer program product comprising:
a non-transitory computer-readable storage medium comprising instructions stored therein, which, when executed by a processor of a computer, are configured to cause the processor to perform operations comprising
generating a user-interface configured to receive a user input, receiving the user input, wherein the user input is configured to cause instantiation of a plurality of instances of a time-based organization hierarchy, wherein each instance of the plurality of instances comprises
a plurality of nodes,
information regarding a start date for the each instance, and
information regarding an end date for the each instance, each node of the plurality of nodes of the each instance comprises information regarding a territory of a plurality of territories, each of the plurality of territories corresponds to a corresponding one of the plurality of nodes of the each instance, the information regarding the territory comprises
a plurality of positions,
a plurality of quotas, and
one or more assignment rules, each of the plurality of quotas corresponds to a corresponding position of the plurality of positions, a respective quota period is defined for the each of the plurality of quotas, the each instance, in its entirety, is effective only for an effective period defined by the start date and the end date, and the plurality of instances differ from one another at least by virtue of the effective periods of the plurality of instances not overlapping one another, in response to receiving a first sales data input corresponding to a transaction,
performing an assignment rule evaluation, wherein
the transaction is associated with an order date, and
the performing the assignment rule evaluation comprises
identifying a single instance of the plurality of instances by determining whether an effective period of the single instance includes the order date,
in response to a determination that the effective period of the single instance includes the order date,
selecting the single instance, in its entirety, from among the plurality of instances,
determining whether a net change in the transaction has occurred, wherein
the transaction credit is applied to at least one quota of the plurality of quotas, and
the at least one quota corresponds to at least one position of the plurality of positions, and
generating a result, wherein
the generating comprises
evaluating at least one assignment rule of the one or more assignment rules of the single instance, wherein
the evaluating comprises
determining whether the at least one assignment rule is applicable to the transaction, and
the evaluating uses information regarding the net change, if the net change in the transaction has occurred, and
evaluating any validation rules associated with the single instance, and
in response to the result being a positive result,
assigning a transaction credit to the at least one position, wherein the transaction credit corresponds to the transaction, and
the transaction credit is assigned to the at least one position, in a manner specified by the at least one assignment rule.

14. The computer program product of claim 13, wherein the operations further comprise:
in response to receiving a second sales data input corresponding to another transaction,
performing, using the computer processor, another assignment rule evaluation, wherein
the another transaction is associated with another order date, and
the performing the another assignment rule evaluation comprises identifying another single instance of the plurality of instances by determining whether an effective period of the another single instance includes the another order date, and
in response to a determination that the effective period of the another single instance includes the another order date,
selecting the another single instance, in its entirety, from among the plurality of instances,
generating another result by evaluating at least one assignment rule of one or more assignment rules of the another single instance, and
generating a rule list by labeling each of the at least one assignment rule of one or more assignment rules with a sequence number; and
in response to the another result being the positive result, assigning another transaction credit to at least one position of the plurality of positions of the another single instance, wherein
the another transaction credit corresponds to the another transaction, and
the another transaction credit is assigned to the at least one position of the another single instance, in a manner as specified by the at least one assignment rule of the another single instance.

15. The computer program product of claim 14, wherein the sequence number corresponds to at least one assignment rule attribute.

16. The computer program product of claim 15, wherein the at least one assignment rule attribute comprises at least one of
a rule type priority number,
a lowest level flag, or
a hierarchy level indicator, and
the each of the plurality of territories corresponds to one of
a corresponding one of a plurality of geographical territories, or
a corresponding one of a plurality of industry sectors.

17. The computer program product of claim 13, wherein the assigning the transaction credit comprises:
creating an assignment record, wherein
the assignment record comprises
a geographical territory,
a position, and
a user-specified sales credit corresponding to the assignment rule; and
adding the assignment record to an assignment object record associated with the transaction.

18. The computer program product of claim 17, wherein, the operations further comprise:
validating the assignment record, wherein
the validating returns an error if an improper assignment is identified,
the validating is performed prior to the adding the assignment record to the assignment object record, and
the validating comprises
in response to the improper assignment being identified, preventing the adding the assignment record to the assignment object record.

19. The computer program product of claim 13, wherein the operations further comprise:
monitoring the transaction for a user-specified change, subsequent to the generating the assignment object record;
reprocessing the at least one assignment rule in response to the user-specified change; and
generating a modified assignment object record for the one instance in response to a second positive result yielded by the reprocessing the at least one assignment rule, wherein
the modified assignment object record corresponds to the transaction.

20. The computer program product of claim 13, wherein the operations further comprise:
identifying the at least one assignment rule that corresponds to the single instance.

21. A computer program product comprising:
a non-transitory computer-readable storage medium comprising instructions stored therein, which, when executed by a processor of a computer, are configured to cause the processor to perform operations comprising
generating a user interface, wherein
the user interface comprises a user interface display, and
the user interface display is configured to receive a user input,
receiving the user input, wherein
the user input is configured to cause instantiation of a plurality of instances of a time-based organization hierarchy,
each instance of the plurality of instances comprises
a plurality of nodes,
information regarding a start date for the each instance, and
information regarding an end date for the each instance,
each node of the plurality of nodes of the each instance comprises
information regarding a territory of a plurality of territories,
each of the plurality of territories corresponds to a corresponding one of the plurality of nodes of the each instance,
the information regarding the territory comprises
a plurality of positions,
a plurality of quotas, and
one or more assignment rules,
each of the plurality of quotas corresponds to a corresponding position of the plurality of positions,
a respective quota period is defined for the each of the plurality of quotas,
the each instance, in its entirety, is effective only for an effective period defined by the start date and the end date, and
the plurality of instances differ from one another at least by virtue of the effective periods of the plurality of instances not overlapping one another, receiving a sales data input, wherein
the sales data input comprises
an order date corresponding to a transaction,
in response to the receiving the sales data input, processing at least one assignment rule of the one or more assignment rules, wherein
the processing comprises
identifying a single instance of the plurality of instances by determining whether an effective period of the single instance includes the order date,
in response to a determination that the effective period of the single instance includes the order date,
selecting the single instance, in its entirety, from among the plurality of instances,
determining whether a net change in the transaction has occurred, wherein
the transaction credit is applied to at least one quota of the plurality of quotas, and
the at least one quota corresponds to at least one position of the plurality of positions, and
generating a result, wherein
the generating comprises
evaluating at least one assignment rule of the one or more assignment rules of the single instance, wherein
the evaluating comprises
determining whether the at least one assignment rule is applicable to the transaction, and
the evaluating uses information regarding the net change, if the net change in the transaction has occurred, and
evaluating any validation rules associated with the single instance, and
in response to the result being a positive result, generating an assignment object record for the single instance, wherein
the assignment object record corresponds to the transaction,
the at least one assignment rule specifies at least one position of the one instance and at least one credit allocation, and
the assignment object record comprises the at least one position and the at least one credit allocation.

22. The computer program product of claim 21, wherein the operations further comprise:
monitoring the transaction for a user-specified change, subsequent to the generating the assignment object record;
reprocessing the at least one assignment rule in response to the user-specified change; and
generating a modified assignment object record for the one instance in response to a second positive result yielded by the reprocessing the at least one assignment rule, wherein
the modified assignment object record corresponds to the transaction.

23. A computer system comprising:
a processor;
a computer-readable storage medium, coupled to the processor; and
a plurality of instructions, encoded in the computer-readable medium and configured to cause the processor to instantiate a plurality of instances of a time-based organization hierarchy, wherein each instance of the plurality of instances comprises
a plurality of nodes,
information regarding a start date for the each instance, and
information regarding an end date for the each instance,
each node of the plurality of nodes of the each instance comprises
information regarding a territory of a plurality of territories,
each of the plurality of territories corresponds to a corresponding one of the plurality of nodes of the each instance,
the information regarding the territory comprises
a plurality of positions,
a plurality of quotas, and
one or more assignment rules,
each of the plurality of quotas corresponds to a corresponding position of the plurality of positions,
a respective quota period is defined for the each of the plurality of quotas,
the each instance, in its entirety, is effective only for an effective period defined by the start date and the end date, and
the plurality of instances differ from one another at least by virtue of the effective periods of the plurality of instances not overlapping one another,
in response to receiving a first sales data input corresponding to a transaction,
perform an assignment rule evaluation, wherein
the transaction is associated with an order date, and
the instructions configured to cause the processor to perform the assignment rule evaluation comprise instructions configured to cause the processor to
identify a single instance of the plurality of instances by determining whether an effective period of the single instance includes the order date,
in response to a determination that the effective period of the single instance includes the order date,
select the single instance, in its entirety, from among the plurality of instances,
determine whether a net change in the transaction has occurred, wherein
the transaction credit is applied to at least one quota of the plurality of quotas, and
the at least one quota corresponds to at least one position of the plurality of positions, and
generate a result, wherein
the generating comprises
evaluating at least one assignment rule of the one or more assignment rules of the single instance, wherein
the evaluating comprises
determining whether the at least one assignment rule is applicable to the transaction, and
the evaluating uses information regarding the net change, if the net change in the transaction has occurred, and
evaluating any validation rules associated with the single instance, and in response to the result being a positive result, assign a transaction credit to the at least one position, wherein the transaction credit corresponds to the transaction, and the transaction credit is assigned to the at least one position, in a manner specified by the at least one assignment rule.

* * * * *

UNITED STATES PATENT AND TRADEMARK OFFICE
CERTIFICATE OF CORRECTION

PATENT NO. : 8,600,799 B2  
APPLICATION NO. : 10/273679  
DATED : December 3, 2013  
INVENTOR(S) : Chang et al.

Page 1 of 1

It is certified that error appears in the above-identified patent and that said Letters Patent is hereby corrected as shown below:

In the Claims

In column 22, line 3, in Claim 13, after "hierarchy," delete "wherein".

Signed and Sealed this  
Tenth Day of June, 2014

Michelle K. Lee  
*Deputy Director of the United States Patent and Trademark Office*